United States Patent
Ye et al.

(10) Patent No.: US 12,432,755 B2
(45) Date of Patent: Sep. 30, 2025

(54) PROCEDURES OF SIDELINK RESOURCE POOL RESOURCE USE WITH REDUCED SENSING

(71) Applicant: APPLE INC., Cupertino, CA (US)

(72) Inventors: Chunxuan Ye, San Diego, CA (US); Dawei Zhang, Saratoga, CA (US); Haitong Sun, Cupertino, CA (US); Hong He, San Jose, CA (US); Huaning Niu, San Jose, CA (US); Oghenekome Oteri, San Diego, CA (US); Seyed Ali Akbar Fakoorian, San Diego, CA (US); Wei Zeng, Saratoga, CA (US); Weidong Yang, San Diego, CA (US); Yushu Zhang, Beijing (CN)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 17/904,512

(22) PCT Filed: Sep. 24, 2021

(86) PCT No.: PCT/CN2021/120365
§ 371 (c)(1),
(2) Date: Aug. 18, 2022

(87) PCT Pub. No.: WO2023/044765
PCT Pub. Date: Mar. 30, 2023

(65) Prior Publication Data
US 2024/0196419 A1    Jun. 13, 2024

(51) Int. Cl.
*H04W 72/40* (2023.01)
*H04W 72/541* (2023.01)
*H04W 72/0446* (2023.01)

(52) U.S. Cl.
CPC ......... *H04W 72/40* (2023.01); *H04W 72/541* (2023.01); *H04W 72/0446* (2013.01)

(58) Field of Classification Search
CPC ... H04W 72/02; H04W 72/40; H04W 72/541; H04W 72/0446; H04W 74/0808
See application file for complete search history.

(56) References Cited

U.S. PATENT DOCUMENTS

| | | |
|---|---|---|
| 11,871,380 B2 | 1/2024 | Li et al. |
| 12,133,119 B2 | 10/2024 | Nguyen et al. |

(Continued)

FOREIGN PATENT DOCUMENTS

| | | |
|---|---|---|
| CN | 111194057 A | 5/2020 |
| CN | 111586722 A | 8/2020 |

(Continued)

OTHER PUBLICATIONS

Huawei et al., "Sidelink resource allocation to reduce power consumption", 3GPP TSG RAN WG1 Meeting #106-e, R1-2106477, E-meeting, Aug. 16-27, 2021, Total pp. 26 (Year: 2021).*

(Continued)

*Primary Examiner* — Shah M Rahman
(74) *Attorney, Agent, or Firm* — Dorsey & Whitney LLP

(57) ABSTRACT

Systems and methods for sidelink (SL) resource pool resource use by a user equipment (UE) are disclosed herein. In some embodiments, when the UE performs contiguous partial sensing in addition to periodic partial sensing, the UE performs one of resource selection and resource re-evaluation based a size of a time gap between a slot where the UE has SL data and a first slot of periodic-based candidate slots within a resource selection window. In other embodiments, the UE performs contiguous partial sensing without additional periodic partial sensing in the case where a packet delay budget (PDB) for the SL data is greater than a threshold. In some embodiments, the UE performs periodic partial sensing for resource re-evaluation and/or resource pre-emption according to a set of periodicity values $P_{reserve,re-ev}$ (and optionally period definition data $K_{re-ev}$).

(Continued)

Restrictions on the use of random resource selection by the UE are also described.

20 Claims, 14 Drawing Sheets

(56) References Cited

U.S. PATENT DOCUMENTS

| | | | |
|---|---|---|---|
| 12,250,660 | B2 | 3/2025 | Ye et al. |
| 2017/0188391 | A1 | 6/2017 | Rajagopal et al. |
| 2019/0306835 | A1 | 10/2019 | Hoang et al. |
| 2019/0313405 | A1 | 10/2019 | Li et al. |
| 2019/0386803 | A1 | 12/2019 | Cai et al. |
| 2020/0029245 | A1 | 1/2020 | Khoryaev et al. |
| 2020/0229205 | A1 | 7/2020 | Bharadwaj et al. |
| 2020/0235848 | A1 | 7/2020 | Nguyen et al. |
| 2020/0252910 | A1 | 8/2020 | Wu et al. |
| 2020/0267729 | A1 | 8/2020 | Kim et al. |
| 2021/0007081 | A1 | 1/2021 | Shin et al. |
| 2021/0051525 | A1 | 2/2021 | Cao et al. |
| 2021/0105104 | A1 | 4/2021 | Cao et al. |
| 2021/0307022 | A1 | 9/2021 | Nguyen et al. |
| 2022/0046596 | A1* | 2/2022 | Chen ............ H04W 72/0446 |
| 2022/0116917 | A1 | 4/2022 | Zhao et al. |
| 2022/0124561 | A1 | 4/2022 | Wu et al. |
| 2022/0346180 | A1* | 10/2022 | Tseng ............... H04W 76/14 |
| 2022/0400469 | A1* | 12/2022 | Li ..................... H04W 74/0808 |
| 2022/0400527 | A1 | 12/2022 | Yoon |
| 2022/0408357 | A1* | 12/2022 | Huang ............. H04W 52/0225 |
| 2022/0417991 | A1 | 12/2022 | Farag |
| 2023/0024809 | A1 | 1/2023 | Cheng et al. |
| 2023/0050353 | A1* | 2/2023 | Miao ............... H04W 74/0808 |
| 2023/0080157 | A1* | 3/2023 | Ko ..................... H04W 74/0808 370/329 |
| 2023/0180185 | A1 | 6/2023 | Ye et al. |
| 2023/0180186 | A1 | 6/2023 | Ye et al. |
| 2023/0199725 | A1* | 6/2023 | Ko ........................ H04W 92/18 370/329 |
| 2023/0300799 | A1 | 9/2023 | Lee |
| 2023/0337188 | A1 | 10/2023 | Selvanesan et al. |
| 2024/0015845 | A1* | 1/2024 | Mohammad Soleymani ............. H04W 72/52 |
| 2024/0031997 | A1* | 1/2024 | Lin ......................... H04W 4/40 |
| 2024/0031999 | A1* | 1/2024 | Yue ....................... H04W 72/02 |
| 2024/0032099 | A1* | 1/2024 | Hoang ................. H04W 76/28 |
| 2024/0147435 | A1* | 5/2024 | Zhang ................. H04W 72/02 |
| 2024/0195561 | A1 | 6/2024 | Yu et al. |
| 2024/0214940 | A1 | 6/2024 | Zhang |
| 2024/0276522 | A1* | 8/2024 | Leon Calvo .......... H04W 72/25 |
| 2024/0349314 | A1 | 10/2024 | Yoshioka et al. |
| 2024/0365342 | A1 | 10/2024 | Ko et al. |
| 2024/0389075 | A1* | 11/2024 | Ko ........................... H04W 4/40 |

FOREIGN PATENT DOCUMENTS

| | | |
|---|---|---|
| CN | 113099479 A | 7/2021 |
| EP | 3780891 A1 | 2/2021 |
| EP | 4280735 A1 | 11/2023 |
| WO | 2020011229 A1 | 1/2020 |
| WO | 2020024175 A1 | 2/2020 |
| WO | 2020159329 A1 | 8/2020 |
| WO | 2020198760 A2 | 10/2020 |
| WO | 2020226399 A1 | 11/2020 |
| WO | 2021147028 A1 | 7/2021 |
| WO | 2021189254 A1 | 9/2021 |
| WO | 2022151209 A1 | 7/2022 |
| WO | 2022151211 A1 | 7/2022 |

OTHER PUBLICATIONS

Yue et al., "Method and Apparatus of Partial Sensing for Resource Selection in Sidelink Communication", U.S. Appl. No. 63/171,006, filed Apr. 5, 2021, Total pp. 26 (Year: 2021).*

Fujitsu, "Considerations on partial sensing and DRX in NR Sidelink", 3GPP TSG RAN WG1 Meeting #106-e, R1-2107037, e-Meeting, Aug. 16-27, 2021, Tptal pp. 16 (Year: 2021).*

Apple, "Sidelink Resource Allocation for Power Saving", R1-2107760, 3GPP TSG RAN WG1 #106-e, e-Meeting, Agenda Item 8.11.1.1, Aug. 16-27, 2021, 12 pages.

PCT/CN2021/120365, International Search Report and Written Opinion, Jun. 29, 2022, 9 pages.

U.S. Appl. No. 18/477,377, Final Office Action, Apr. 16, 2025, 23 pages.

U.S. Appl. No. 18/477,377, Non-Final Office Action, Dec. 4, 2024, 20 pages.

LG Electronics, "Discussion on resource allocation for power saving", R1-2107528, 3GPP TSG RAN WG1 Meeting #106-e. e-Meeting, Agenda Item 8.11.1.1, Aug. 16-27, 2021, 27 pages.

U.S. Appl. No. 17/593,501, Notice of Allowance, Jun. 26, 2025, 10 pages.

Non-Final Office Action, U.S. Appl. No. 17/593,501, Dec. 5, 2024, 18 pages.

Notice of Allowance, U.S. Appl. No. 17/593,692, Nov. 19, 2024, 10 pages.

Notice of Allowance, U.S. Appl. No. 17/593,692, Sep. 18, 2024, 7 pages.

Extended European Search Report, European Application No. 21918417.3, Sep. 23, 2024, 13 pages.

Extended European Search Report, European Application No. 21918419.9, Nov. 27, 2024, 20 pages.

Partial European Search Report, European Application No. 21918419.9, Sep. 3, 2024, 14 pages.

Apple, "On Sidelink Resource Allocation for Power Saving", R1-2105126, 3GPP TSG RAN WG1 #105-e, e-Meeting, Agenda Item 8.11.1.1, May 10-27, 2021, 13 pages.

Caict, "Considerations on the resource allocation for NR sidelink Mode2", R1-1913029, 3GPP TSG RAN WG1 Meeting #99 Reno, US, Agenda Item 7.2.4.2.2, Nov. 18-22, 2019, 5 pages.

CMCC, "Discussion on resource allocation for power saving", R1-2107422, 3GPP TSG RAN WG1 Meeting #106-e, e-Meeting, Agenda Item 8.11.1.1, Aug. 16-27, 2021, 9 pages.

CMCC, "Discussion on SA2 LS and solutions for slice-based cell reselection", R2-2010367, 3GPP TSG-RAN WG2 Meeting #112 electronic, Online, Agenda 8.8.2, Nov. 2-13, 2020, 6 pages.

Huawei, Hisilicon, "CR on PDCP duplication related operations in sidelink LCP procedure and resource reselection procedure", R2-1902493, 3GPP TSG-RAN WG2 #105, Athens, Greece, Change Request 36.321 CR 1432 rev 1 Current version 15.4.0, 4 pages.

Huawei, Hisilicon, "Evaluation results for P-UE partial sensing", R1-1611136, 3GPP TSG RAN WG1 Meeting #87, Reno, Nevada, Agenda Item 6.2.1.2.2, Nov. 14-18, 2016, 7 pages.

Intel Corporation, "Sidelink Resource Allocation Mode-2 Design for NR V2X Communication", R1-1906796, 3GPP TSG RAN WG1 Meeting #97, Reno, Nevada, Agenda 8.11.2.1, May 13-17, 2019, 18 pages.

Ne, "Discussion on resource allocation for power saving", R1-2008950, 3GPP TSG RAN WG1 #103-e, e-Meeting, Agenda Item 8.11.2.1, Oct. 26-Nov. 13, 2020, 6 pages.

NTT Docomo, Inc., "Discussion on sidelink resource allocation for power saving", R1-2009193, 3GPP TSG RAN WG1 #103, e-Meeting, Agenda Item 8.11.2.1, Oct. 26-Nov. 13, 2020, 10 pages.

International Search Report and Written Opinion, Application No. PCT/CN2021/071858, Oct. 20, 2021, 9 pages.

International Search Report and Written Opinion, Application No. PCT/CN2021/071860, Oct. 11, 2021, 9 pages.

Samsung, "On resource allocation for power saving", R1-2105334, 3GPP TSG RAN WG1 Meeting #105-e, e-Meeting, Agenda Item 8.11.1.1, May 10-27, 2021, 15 pages.

Sequans Communications, "Partial sensing for pedestrian UEs", R1-1611266, 3GPP TSG RAN WG1 Meeting #87, Reno, Nevada, Agenda Item 6.2.1.2.2, Nov. 14-18, 2016, 6 pages.

* cited by examiner

PROCEDURES OF SIDELINK RESOURCE POOL RESOURCE USE WITH REDUCED SENSING

TECHNICAL FIELD

This application relates generally to wireless communication systems, including such systems having user equipment (UE) that perform contiguous partial sensing, periodic partial sensing, and/or random resource selection in connection with a sidelink (SL) transmission of SL data on a SL resource pool used by the UE.

BACKGROUND

Wireless mobile communication technology uses various standards and protocols to transmit data between a base station and a wireless communication device. Wireless communication system standards and protocols can include, for example, 3rd Generation Partnership Project (3GPP) long term evolution (LTE) (e.g., 4G), 3GPP new radio (NR) (e.g., 5G), and IEEE 802.11 standard for wireless local area networks (WLAN) (commonly known to industry groups as Wi-Fi®).

As contemplated by the 3GPP, different wireless communication systems standards and protocols can use various radio access networks (RANs) for communicating between a base station of the RAN (which may also sometimes be referred to generally as a RAN node, a network node, or simply a node) and a wireless communication device known as a user equipment (UE), 3GPP RANs can include, for example, global system for mobile communications (GSM), enhanced data rates for GSM evolution (EDGE) RAN (GERAN), Universal Terrestrial Radio Access Network (UTRAN), Evolved Universal Terrestrial Radio Access Network (E-UTRAN), and/or Next-Generation Radio Access Network (NG-RAN).

Each RAN may use one or more radio access technologies (RATs) to perform communication between the base station and the UE. For example, the GERAN implements GSM and/or EDGE RAT, the UTRAN implements universal mobile telecommunication system (UMTS) RAT or other 3GPP RAT, the E-UTRAN implements LTE RAT (sometimes simply referred to as LTE), and NG-RAN implements NR RAT (sometimes referred to herein as 5G RAT, 5G NR RAT, or simply NR). In certain deployments, the E-UTRAN may also implement NR RAT. In certain deployments, NG-RAN may also implement LTE RAT.

A base station used by a RAN may correspond to that RAN. One example of an E-UTRAN base station is an Evolved Universal Terrestrial Radio Access Network (E-UTRAN) Node B (also commonly denoted as evolved Node B, enhanced Node B, eNodeB, or eNB). One example of an NG-RAN base station is a next generation Node B (also sometimes referred to as a g Node B or gNB).

A RAN provides its communication services with external entities through its connection to a core network (CN). For example, E-UTRAN may utilize an Evolved Packet Core (EPC), while NG-RAN may utilize a 5G Core Network (5GC).

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Figure 1:
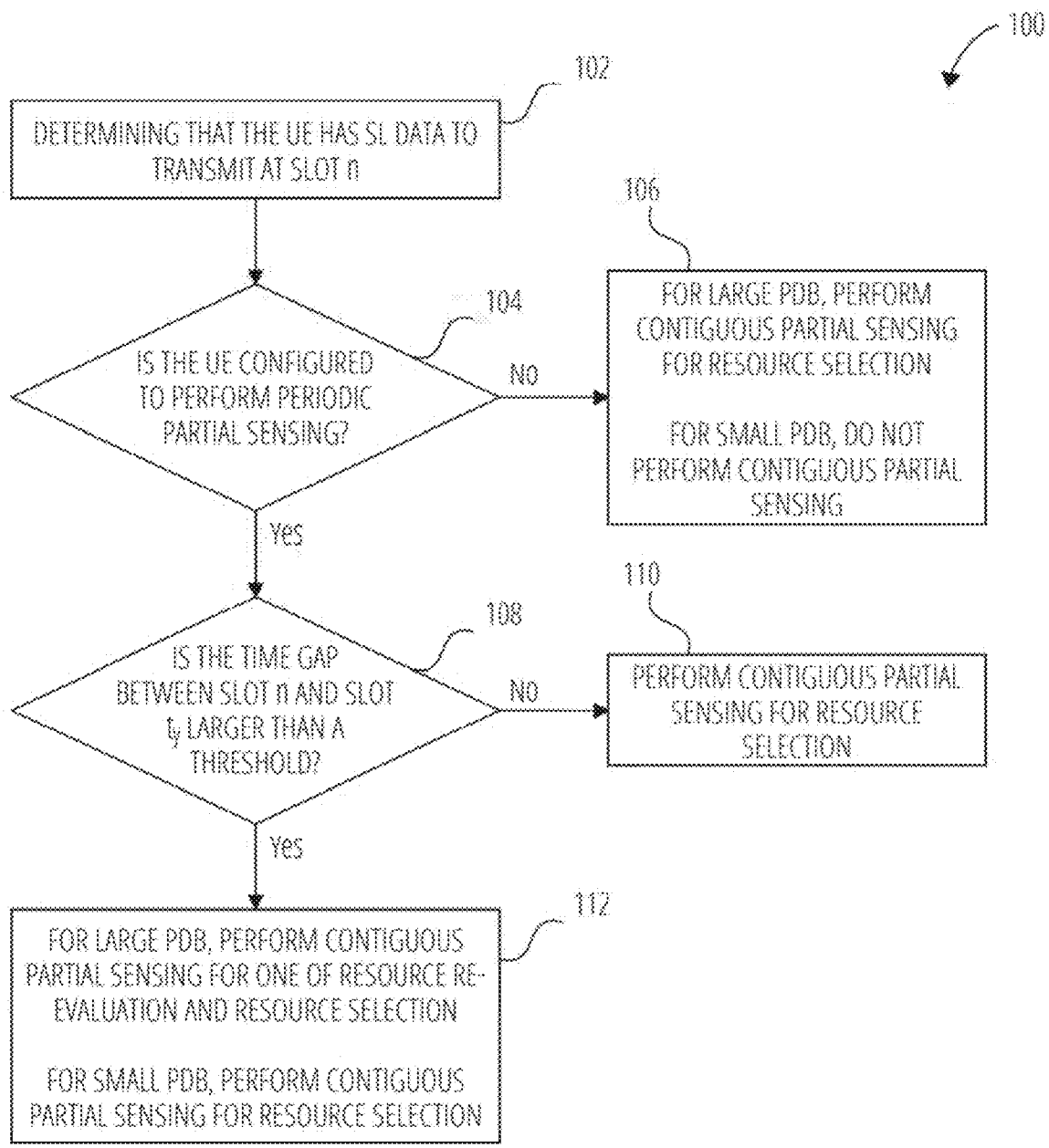
FIG. 1 illustrates a method of a UE, according to an embodiment.

Various embodiments are described with regard to a UE. However, reference to a UE is merely provided for illustrative purposes. The example embodiments may be utilized with any electronic component that may establish a connection to a network and is configured with the hardware, software, and/or firmware to exchange information and data with the network. Therefore, the UE as described herein is used to represent any appropriate electronic component.

UEs may support one or more sidelink (SL) mechanisms, whereby a UE communicates with another (peer) UE using signaling sent from one of the UE directly to the other of the UE (e.g., without any intermediate device relaying those signals between the UE).

SL mechanisms may allocate or schedule resources according to one of multiple possible modes. In a Mode 1 resource allocation scheme for SL, a network of the wireless communication system is responsible for coordinating the scheduling of SL resources of a SL resource pool on the corresponding RAT (e.g., NR RAT) that are used by one or more UE to perform sidelink operations (SL transmission and/or SL reception). In a Mode 2 resource allocation scheme for SL, a UE may autonomously schedule resources of such a SL resource pool on the given RAT for its own use.

When using a Mode 2 resource allocation scheme, upon determining that there is a need to perform a SL transmission, the UE may select transmission resources from a set of candidate resources. The set of candidate resources may fall within a resource selection window. The method of selection of resources from the candidate resources may include/use one or more of random resource selection, full sensing, continuous partial sensing, periodic partial sensing, resource re-selection, and resource pre-emption, among other options. A UE may be configured (e.g., by a base station) or pre-configured (e.g., according to a definition in UE memory) to use one or more of these mechanisms.

In some cases, a UE may be configured or pre-configured to use contiguous partial sensing attendant to selecting resources from the SL resource pool for SL transmission. Once a resource selection trigger is identified at the UE, a resource selection window is identified within the SL resource pool. Contiguous partial sensing may be used, at a time prior to the resource selection window, to detect reservations of resources in the resource selection window by other UE that are also using the SL resource pool. When using contiguous partial sensing, it may be that only a subset of the resources in of the SL resource pool are so monitored.

The nature of the contiguous partial sensing may be that sensing is executed over a continuous period of time during the preparatory to the SL transmission. In other words, the contiguous partial sensing may not be tied to any periodicity definition in that controls for periods defining when sensing should and/or should not occur prior to the SL transmission.

A UE may be configured or pre-configured to use periodic partial sensing attendant to selecting resources from the SL resource pool for SL transmission. As before, once a resource selection trigger is identified at the UE, a resource selection window is identified within the SL resource pool. Periodic partial sensing may be used, at a time prior to the resource selection window, to detect reservations of resources in the resource selection window by other UE that are also using the SL resource pool. The periodic partial sensing may monitor sensing occasions that correspond to a later (e.g., slot-wise) grouping of resources within a resource selection window that corresponds to the periodicity and size of the sensing occasions used. This grouping of candidate resources within the overall resource selection window that correspond to the periodic partial sensing in this manner may be referred to herein as periodic-based candidate slots. The periodic-based candidate slots may cover a subset of all the candidate resources in the resource selection window.

The nature of the periodic partial sensing may be that sensing is executed over defined periods preparatory to the SL transmission. In other words, the periodic partial sensing may be controlled by one or more periodicity definition(s) that controls when sensing should and/or should not occur prior to the SL transmission.

Resources of the SL resource pool are determined to have been reserved by other UE as identified by the UE (e.g., using contiguous partial sensing, periodic partial sensing, and/or any other additional sensing mechanism) may accordingly be removed from the set of (tentative) candidate resources under consideration by the UE for the SL transmission.

It may be that, for a SL resource pool with which a UE is configured (or pre-configured) to use (at least) partial sensing, if a UE performs contiguous partial sensing as at least part of that partial sensing, and resource selection (or re-selection) is triggered in a slot n, the UE may monitor, for the purpose of the resource selection (or the resource re-selection), using contiguous partial sensing, slots between slot n+$T_A$ slots and slot n+$T_B$ slots (e.g., a contiguous partial sensing window). Based on all available sensing results, the UE performs identification of candidate resources in or after slot n+$T_B$ slots. Note that in such cases the UE may have (also) performed periodic partial sensing, and the results of this periodic partial sensing may (also) be taken into account.

It is contemplated that each of the values of $T_A$ and/or $T_B$ could be positive, negative, or zero. Further, it is contemplated that the values of $T_A$ and/or $T_B$ could change based on a current operating scenario or condition (e.g., different values may be relevant based on whether there is a transmission of periodic traffic, whether there is a transmission of aperiodic traffic, the predictability of the slot n, a remaining packed delay budget (PDB) for data to be transmitted, whether resource re-evaluation and/or pre-emption checking are performed, whether hybrid automatic repeat request (HARQ) feedback signaling is performed, the value of a channel busy ratio (CBR) and/or a channel occupancy ratio (CR), whether the UE is in a power saving mode, etc.).

For periodic partial sensing, a set of one or more periodicity values may be used to define how to perform periodic sensing (prior to the SL transmission) as part of the resource selection process. These one or more periodicity values may be denoted $P_{reserve}$. These periodicity values may correspond to periodicities used prior to the SL transmission to perform sensing for resource reservation from other UEs.

In cases where the $P_{reserve}$ values have not been configured or pre-configured to the UE, the UE may understand that $P_{reserve}$ is equal to the set of all values from a configured or pre-configured set sl-ResourceReservePeriodList known to the UE that represents all supported periodicities of the SL resource pool. In other cases where $P_{reserve}$ is configured and/or pre-configured to the UE, it may be that $P_{reserve}$ are a subset of the supported periodicities of the SL resource pool (e.g., as found in sl-ResourceReservePeriodList). Such a configuration or pre-configuration may exist within/as part of a Mode 2 transmission SL resource pool configuration or pre-configuration provided to/known to the UE. It is contemplated that, in some cases where $P_{reserve}$ is a subset of all the supported periodicities of the SL resource pool, a UE (by implementation) may also review (other) supported periodicities (e.g., of sl-ResourceReservePeriodList) that are not part of $P_{reserve}$. It is also contemplated that a UE could additionally monitor with a periodicity value of $P_{RSVP_{TX}}$, that represents a data periodicity value determined at the UE based on UE traffic, and that is not (necessarily) included in $P_{reserve}$.

It may be that, by default, a UE monitors a most recent sensing occasion (e.g., period) of the periodicities corresponding to the periodicities in $P_{reserve}$ that is located prior to the resource selection trigger slot n and/or the first slot of the periodic-based candidate slots within a resource selection window (subject to a processing time restriction). In some cases, the UE may be configured and/or pre-configured to additionally monitor additional sensing occasions for one or more periods that correspond to periodicities of a periodicity value or set of periodicity values that is configured and/or pre-configured to the UE (and this value or set of values may be denoted K). In some cases, it may be that possible value(s) used could be understood to correspond to the most recent sensing occasion (e.g., period) for a given periodicity before the slot n and/or the first slot of the periodic-based candidate slots and/or the last sensing occasion (e.g., period) prior to the most recent sensing occasion (e.g., period) for the given reservation period. It is contemplated that in other cases, other values could be included in K. It is also contemplated that other details of the configuration or pre-configuration for the resource pool may be included and/or associated with K. For example, an indication of a maximum number of values or sensing occasions (e.g., periods) to use may be provided in K. It may be that a value in K denotes a specific sensing occasion (e.g., period) to monitor, or that it denotes an earliest sensing occasion (e.g., period) to begin monitoring, etc.

In some cases, it may be advantageous to define procedures for determining, for example, a starting slot, an ending slot, and/or other information for a contiguous partial sensing window, depending on one or more of, for example, a PDB of data to be transmitted, whether the data to be transmitted is periodic, and/or whether periodic partial sensing is (also) performed at the UE.

FIG. 1 illustrates a method 100 of a UE, according to an embodiment. The method 100 illustrates a method of determining various circumstances for performing contiguous partial sensing, according to various embodiments.

The method 100 includes determining 102 that the UE has SL data to transmit at a slot n. In some cases, slot n may be predictable, in that the UE is aware that data for SL transmission will be available at that slot). This may be the case when, for example, the data for slot n is associated with ongoing periodic traffic (and is not the initial transmission of that periodic traffic). In other cases, slot n may not be predictable. This may be the case when the data for slot n is aperiodic traffic, or the initial transmission of periodic traffic.

The method 100 further includes determining 104 whether the UE is configured to perform periodic partial sensing. In some cases, the periodic partial sensing may be configured for/triggered at the UE when periodic reservation for another $T_B$ (e.g., as indicated by a sl-MultiReserveResource element) is enabled for the resource pool, when the resource pool is configured (or pre-configuration) to enable partial sensing, and when the partial sensing is configured by a higher layer in the UE.

If the UE is not configured to perform periodic partial sensing, the UE proceeds to performing 106 contiguous partial sensing for resource selection, in the case of a relatively large PDB for the SL data. In the case of a relatively small PDB for the SL data, it may be that contiguous partial sensing is not performed.

If the UE is configured to perform periodic partial sensing, the UE proceeds to determining 108 whether a time gap between slot n and slot $t_y$ is larger than a threshold. The slot n may be a slot of a trigger for resources selection (or re-selection), as described above, and slot $t_y$ may be a first slot of periodic-based candidate slots within a resource selection window. The time gap may be measured in slots.

If the time gap between slot n and slot $t_y$ is not larger than a threshold, then the UE performing 110 contiguous partial sensing for resource selection.

If the time gap between slot n and slot $t_y$ is larger than a threshold, then the UE proceeds to performing 112 contiguous partial sensing for one of resource re-evaluation and resource selection, in the case of a relatively large PDB for the SL data. In the case of a relatively small PDB for the SL data, it may be that contiguous partial sensing is performed for resource selection.

Details of the various possible results for determinations regarding contiguous partial sensing as outlined in FIG. 1 are presented below.

Figure 2:
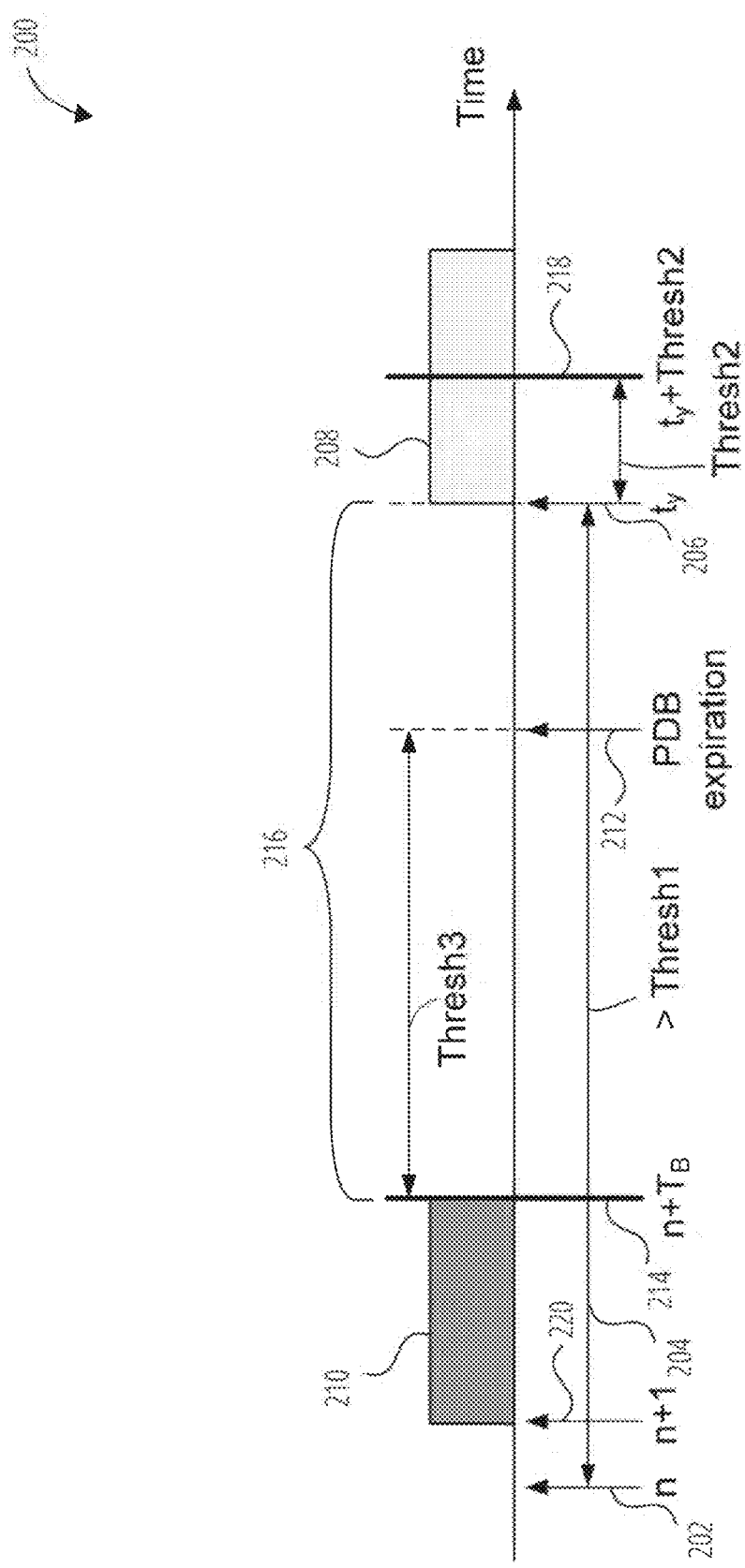
FIG. 2 illustrates a scenario for a UE that performs contiguous partial sensing and periodic partial sensing, according to an embodiment.

FIG. 2 illustrates a scenario 200 for a UE that performs contiguous partial sensing and periodic partial sensing, according to an embodiment. The UE determines that it has SL data to transmit on the SL resource pool (e.g., as provided from a higher layer of the UE) at slot n 202.

The UE calculates the duration of the time gap 204 between the slot n 202 and the slot $t_y$ 206, where the slot $t_y$ 206 is the first slot of periodic-based candidate slots 208 within a resource selection window. In the scenario 200, the UE determines that the duration of the time gap 204 is greater than a first threshold number of slots (as indicated with the text ">Thresh1" in FIG. 2). The first threshold number of slots is configured or pre-configured according to a SL resource pool configuration for the one or more SL transmission resources to be used. The first threshold number of slots may be configured (or pre-configured) to be large enough to ensure a sufficient gap between the slot n 202 and the slot $t_y$ 206 such that at least some of the information gathered at the UE during any contiguous partial sensing window occurring near the slot n 202 (such as the contiguous partial sensing window 210 to be described) is relevant to resources in the region 216 (between the slot at slot n plus $T_y$ slots 214 and the slot $t_y$ 206). For example, in UE that use a 32 slot gap for aperiodic traffic, the first threshold may be greater than 32 slots.

The UE may also identify a slot at slot $t_y$ plus a second threshold number of slots 218. In FIG. 2, the second threshold number of slots is indicated with the text "Thresh2." The second threshold number of slots is configured or pre-configured according to a SL resource pool configuration for the one or more SL transmission resources to be used. The second threshold number of slots may be configured (or pre-configured) to be large enough to include a sufficient portion of the periodic-based candidate slots 208 prior to the slot at slot $t_y$ plus a second threshold number of slots 218, such that the UE would be able to select transmission resources from the periodic-based candidate slots 208 when at least that sufficient portion is available for such a use (e.g., when at least that sufficient portion occurs prior to any PDB expiration slot for the SL data).

The SL data at the UE may have an associated remaining PDB that indicates the maximum amount of time which the UE can use to transmit the SL data. In cases where the remaining PDB is provided to the UE as an amount of time (rather than cases where it is provided in terms of slots), the UE may transform this value into the corresponding amount of slots. The UE may then use this remaining PDB (in terms of slots) to identify a PDB expiration slot 212 by adding this amount of slots to the slot n 202. The remaining PDB may also be denoted $T_{2,min}$ herein.

As shown in the scenario 200, the time gap 204 is greater than the first threshold, and the PDB expiration slot 212 occurs prior to the slot at slot $t_y$ plus a second threshold number of slots 218. Because the PDB expiration slot 212 occurs prior to the slot at slot $t_y$ plus a second threshold number of slots 218, the UE determines that it cannot use resources of the periodic-based candidate slots 208 to perform the SL transmission of the SL data. In such cases, the UE is configured to instead use the illustrated contiguous partial sensing window 210 to perform contiguous partial sensing for resource selection corresponding to one or more resources of the region 216 that is prior to the periodic-based candidate slots 208 (and that (also) occur prior to the PDB expiration slot 212).

In the case of the scenario 200, the existence of the SL data (and thus the location of slot n 202) was not predictable prior to the slot n 202. Accordingly, the contiguous partial sensing window 210 begins at a slot at slot n plus one slot 220, as illustrated.

An end of the contiguous partial sensing window 210 may be controlled by the location of the PDB expiration slot 212. For example, as illustrated, the contiguous partial sensing window 210 may extend from the slot n 202 to a slot at slot n plus $T_B$ slots 214, where $T_B$ is less than a number of slots from the slot n 202 to the PDB expiration slot 212 minus a third threshold number of slots. The third threshold number of slots may be configured (or pre-configured) to be large enough to ensure that there are sufficient resources within the region 216 and prior to the PDB expiration slot 212 that can be used to perform resource selection for the SL transmission, in the event that resources of the periodic-based candidate slots 208 are not used to perform the SL transmission (as is the case in the scenario 200).

As previously described, because the time gap 204 is greater than the first threshold, the UE is aware of the reservation status of at least some of the resources of the region 216 (due to the sensing performed during contiguous partial sensing window 210). Accordingly, the UE uses any of this reservation status information corresponding to any resources of the region 216 that may occur prior to the PDB expiration slot 212 to help inform a selection of SL transmission resources from the region 216 that occur prior to the PDB expiration slot 212 (e.g., the UE avoids selecting any resources from the region 216 and prior to the PDB expiration slot 212 that it knows to be reserved due to the sensing performed during the contiguous partial sensing window 210). The SL data is then sent using the selected SL transmission resources.

Figure 3:
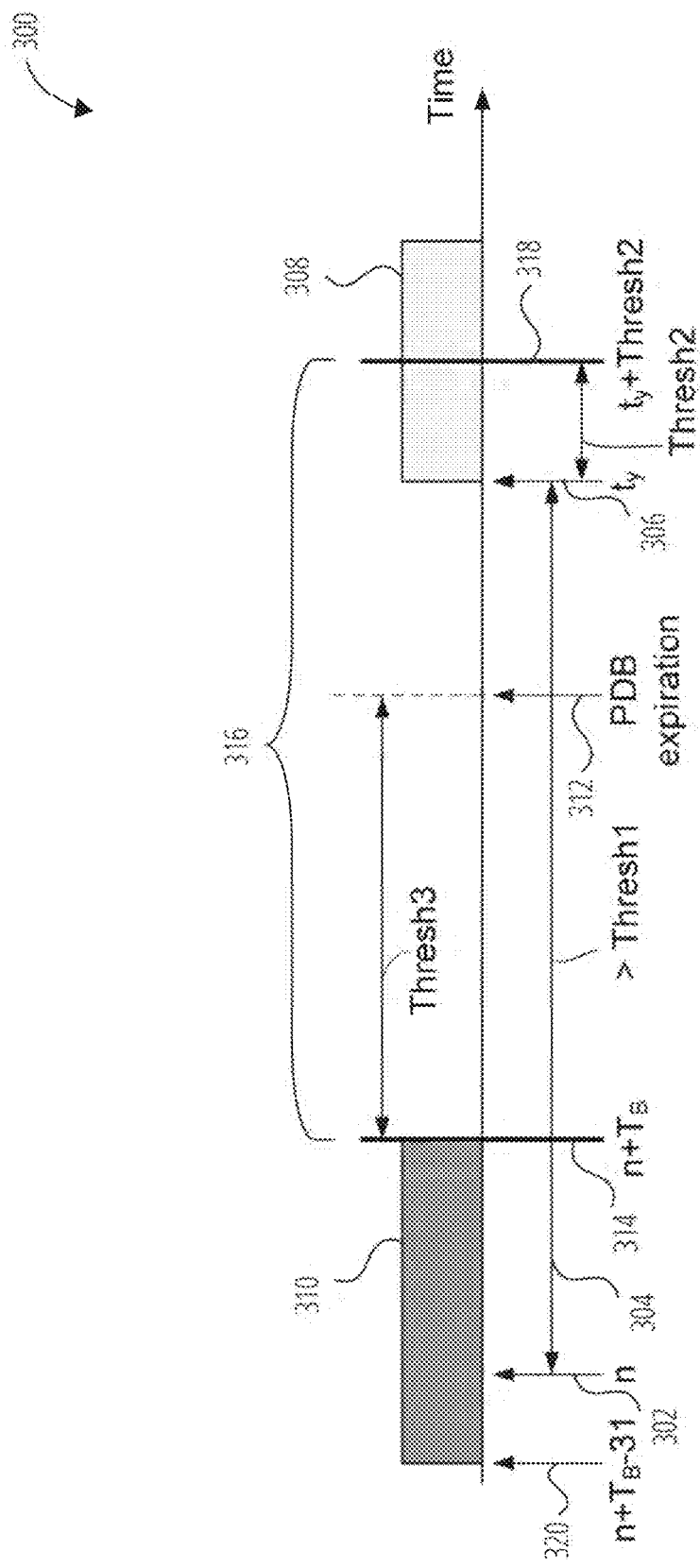
FIG. 3 illustrates a scenario for a UE that performs contiguous partial sensing and periodic partial sensing, according to an embodiment.

FIG. 3 illustrates a scenario 300 for a UE that performs contiguous partial sensing and periodic partial sensing, according to an embodiment. The UE determines that it has SL data to transmit on the SL resource pool (e.g., as provided from a higher layer of the UE) at slot n 302.

The time gap 304, the slot $t_y$ 306, the periodic-based candidate slots 308, the PDB expiration slot 312, the slot at slot n plus $T_B$ slots 314, the region 316, and the slot at slot $t_y$ plus a second threshold number of slots 318 may all be analogous to their similarly named counterparts described in relation to the scenario 200 of FIG. 2. The UE may accordingly make similar decisions (and for similar reasons) as were described in relation to the scenario 200 of FIG. 2.

One difference between FIG. 2 and FIG. 3 is that the scenario 300 illustrates a case where the existence of the SL data (and thus the location of slot n 302) was predictable prior to the slot n 302. Accordingly, the contiguous partial sensing window 310 begins prior to slot n 302 (due to this anticipation). In the scenario 300, it may be that the UE uses a 32 slot gap for aperiodic traffic. Accordingly, by beginning the window at a slot at slot n plus $T_B$ slots minus 31 slots 320, the contiguous partial sensing window 310 covers the entire following 32 slots that occur during the region 316. In alternative cases (not illustrated), a contiguous partial sensing window could begin at a slot n plus $t_y$ slots minus 31 slots (thereby capturing the 31 slots of the region 316 occurring just prior to a slot $t_y$). It is contemplated that a value other than 31 slots could be used in the case where a slot gap is other than 32 (e.g., the 31 corresponds more generally to slot gap−1). Thus, in the scenario 300, the UE has even more information regarding possible reservations of resources in the region 316 and prior to the PDB expiration slot 312 than in the alternative case of the scenario 200 of FIG. 2 described above. Accordingly, the selection of SL transmission resources from the region 316 that occur prior to the PDB expiration slot 212 is even more likely to avoid the inadvertent selection of a resource that is being used by another UE.

Figure 4:
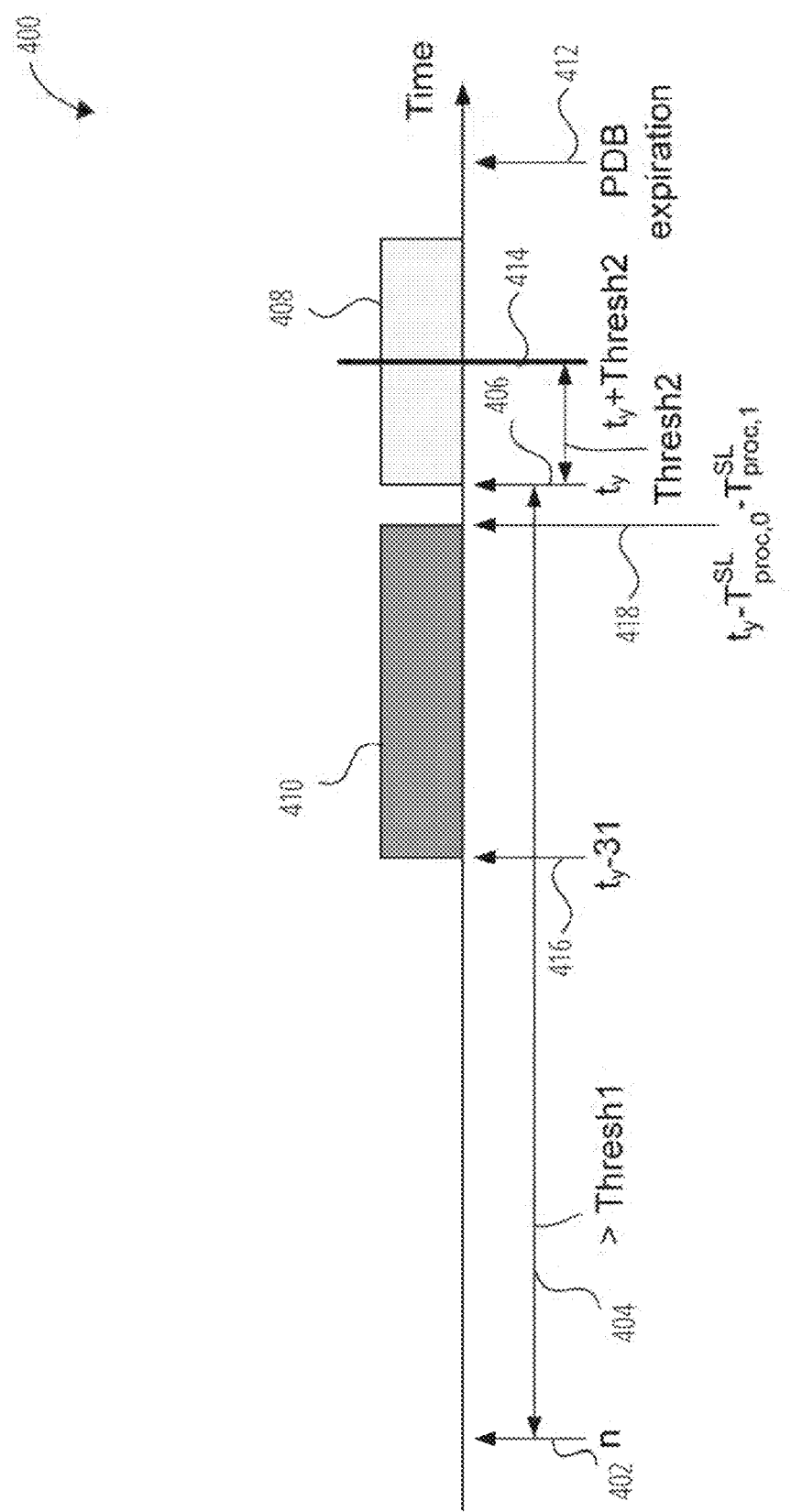
FIG. 4 illustrates a scenario for a UE that performs contiguous partial sensing and periodic partial sensing, according to an embodiment.

FIG. 4 illustrates a scenario 400 for a UE that performs contiguous partial sensing and periodic partial sensing, according to an embodiment. The UE determines that it has SL data to transmit on the SL resource pool (e.g., as provided from a higher layer of the UE) at slot n 402.

The time gap 404, the slot $t_y$ 406, the periodic-based candidate slots 408, and the slot at slot $t_y$ plus a second threshold number of slots 414 may all be analogous to their similarly named counterparts described in relation to the scenario 200 of FIG. 2.

One difference in the scenario 400 as opposed to prior scenarios is that the UE identifies (using a remaining PDB for the SL data) a PDB expiration slot 412 that is after the slot at slot $t_y$ plus a second threshold number of slots 414. Because the PDB expiration slot 412 occurs after the slot at slot $t_y$ plus a second threshold number of slots 414, the UE determines that it can use resources of the periodic-based candidate slots 408 within the overall resource selection window perform the SL transmission of the SL data. In such cases, the UE is configured to use the illustrated contiguous partial sensing window 410 to perform contiguous partial sensing for one of resource selection or resource re-evaluation corresponding to resources of the periodic-based candidate slots 408.

In the case of the scenario 400, the time gap 404 is greater than a first threshold (as such a first threshold is described in relation to FIG. 2). The first threshold may be large enough to account for a slot gap size used by the UE (such that there will be sufficient room for a contiguous partial sensing window 410 that is the length of the slot gap). For example, assuming that the UE of the scenario 400 uses a 32 slot gap for aperiodic traffic, the first threshold may be greater than 32 slots.

Then, in the scenario 400, the contiguous partial sensing window 410 begins at a slot at slot $t_y$ minus 31 slots 416, with the 31 slots corresponding to the 32 slot gap in use. It is contemplated that a value other than 31 slots could be used in the case where a slot gap is other than 32 (e.g., the 31 corresponds more generally to slot gap−1). An end of the contiguous partial sensing window 410 may be controlled by the location of the slot $t_y$ 406. For example, as illustrated, the contiguous partial sensing window 410 may extend from the slot at slot $t_y$ minus 31 slots 416 to a slot at slot $t_y$ minus $T_{proc,0}^{SL}$ minus $T_{proc,1}^{SL}$ 418, where $T_{proc,0}^{SL}$ is a processing time for the sensing results of the contiguous partial sensing window 410 and $T_{proc,1}^{SL}$ is a data transmission preparation time. These values may be understood in terms of symbols; in such a case, the slot at slot $t_y$ minus $T_{proc,0}^{SL}$ minus $T_{proc,1}^{SL}$ 418 may be understood to be the slot in which is found the symbol that is the actual result of the calculation. The placement of the contiguous partial sensing window 410 near the slot $t_y$ 406 may cause that the UE is informed of up-to-date information regarding resources of the periodic-based candidate slots 408.

In some cases, it may be that the UE implementing the scenario 400 has a resource selection capability that causes it to select resources at the time of the slot n 402. In such cases, the selection of resources from the periodic-based candidate slots 408 is made at the time of the slot n 402, and sensing results gathered during contiguous partial sensing window 410 are used for resource re-evaluation purposes (e.g., to check whether a previously selected resource is actually reserved, perhaps preparatory to selecting a different resource instead if this is the case). In other cases, it may be that the UE implementing the scenario 400 has a resource selection capability that causes it to select resources after the time of the contiguous partial sensing window 410 and prior to the periodic-based candidate slots 408. In such cases, the results gathered during the contiguous partial sensing window 410 are used for resource selection purposes (e.g., along with any sensing results gathered according to the (unillustrated) periodic partial sensing for the periodic-based candidate slots 408). In other words, whether the contiguous partial sensing is performed for resource selection or resource re-evaluation may be based on a time at which the UE performs resource selection relative to the contiguous partial sensing window.

Figure 5:
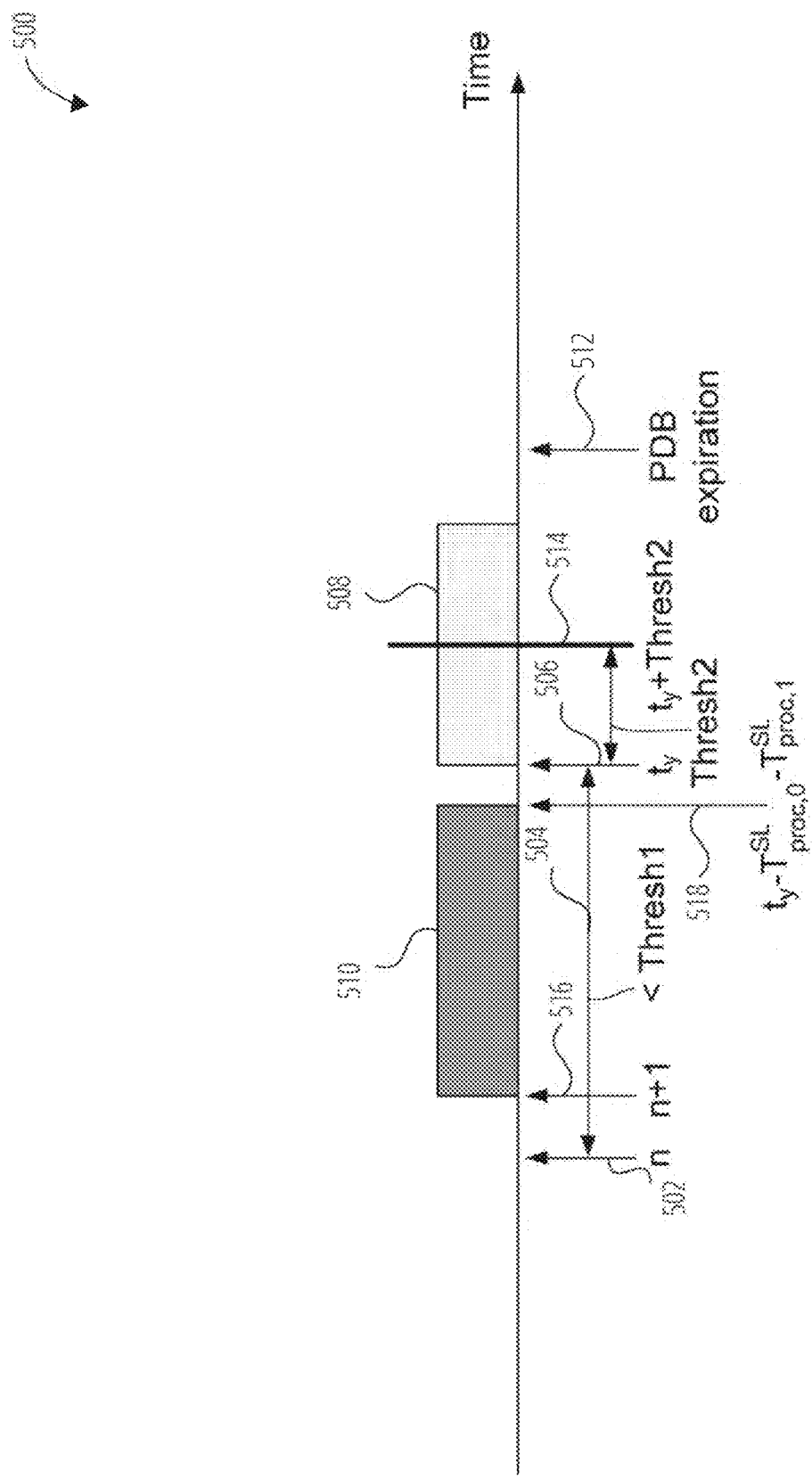
FIG. 5 illustrates a scenario for a UE that performs contiguous partial sensing and periodic partial sensing, according to an embodiment.

FIG. 5 illustrates a scenario 500 for a UE that performs contiguous partial sensing and periodic partial sensing, according to an embodiment. The UE determines that it has SL data to transmit on the SL resource pool (e.g., as provided from a higher layer of the UE) at slot n 502.

The slot $t_y$ 506, the periodic-based candidate slots 508, and the slot at slot $t_y$ plus a second threshold number of slots 514 may all be analogous to their similarly named counterparts described in relation to the scenario 200 of FIG. 2.

The scenario 500 may correspond to the case where a time gap 504 is less than a first threshold (as such a first threshold is described in relation to FIG. 2), as indicated with the text "<Thresh1" in FIG. 5. Accordingly, it is anticipated that in the scenario 500, the contiguous partial sensing window 510 (to be described below) may be less than 32 slots.

Further, in the scenario 500, the UE identifies the PDB expiration slot 512 that is after the slot at slot $t_y$ plus a second threshold number of slots 514. Because the PDB expiration slot 512 occurs after the slot at slot $t_y$ plus a second threshold number of slots 514, the UE determines that it can use resources of the periodic-based candidate slots 408 to perform the SL transmission of the SL data.

In such cases, the UE is configured to use the illustrated contiguous partial sensing window 510 to perform contiguous partial sensing for resource selection corresponding to one or more resources of the periodic-based candidate slots 508. The resource selection may occur after the contiguous partial sensing window 510 and prior to the periodic-based candidate slots 508.

In the case of the scenario 500, the existence of the SL data (and thus the location of slot n 502) was not predictable prior to the slot n 502. Accordingly, the contiguous partial sensing window 510 begins at a slot at slot n plus one slot 516, as illustrated.

An end of the contiguous partial sensing window 510 may be controlled by the location of the slot $t_y$ 506. For example, as illustrated, the contiguous partial sensing window 510 may extend from the slot at slot n plus one slot 516 to a slot at slot $t_y$ minus $T_{proc,0}^{SL}$ minus $T_{proc,1}^{SL}$ 518, where $T_{proc,0}^{SL}$ and $T_{proc,1}^{SL}$ are as described previously. Again, in cases where these values may be understood in terms of symbols, the slot at slot $t_y$ minus $T_{proc,0}^{SL}$ minus $T_{proc,1}^{SL}$ 518 may be understood to be the slot in which is found the symbol that is the actual result of the calculation. The placement of the contiguous partial sensing window 510 near the slot $t_y$ 506 may cause that the UE is informed of up-to-date information regarding resources of the periodic-based candidate slots 508.

Figure 6:
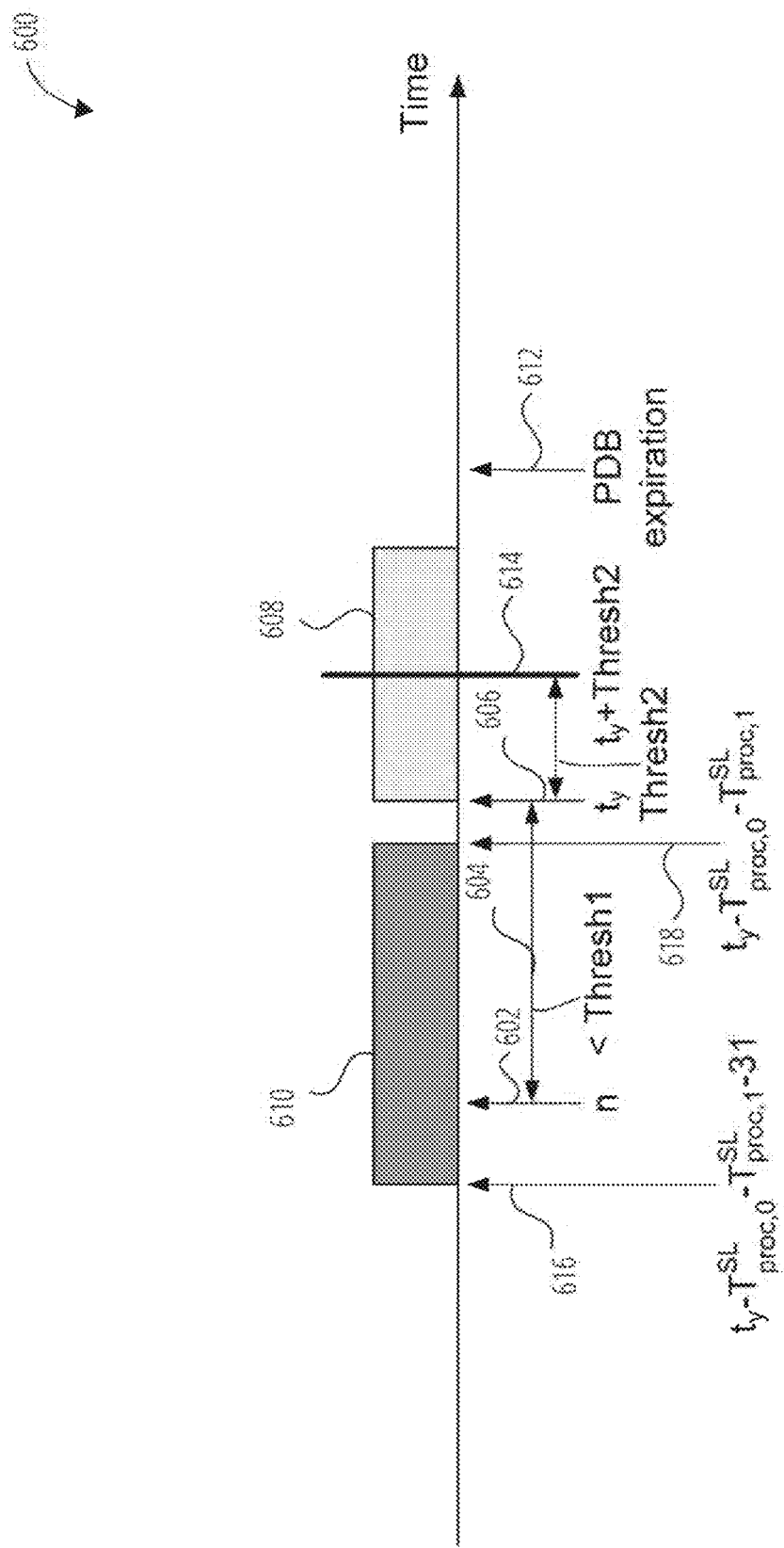
FIG. 6 illustrates a scenario for a UE that performs contiguous partial sensing and periodic partial sensing, according to an embodiment.

FIG. 6 illustrates a scenario 600 for a UE that performs contiguous partial sensing and periodic partial sensing, according to an embodiment. The UE determines that it has SL data to transmit on the SL resource pool (e.g., as provided from a higher layer of the UE) at slot n 602.

The time gap 604, the slot $t_y$ 606, the periodic-based candidate slots 608, the PDB expiration slot 612, the slot at slot $t_y$ plus a second threshold number of slots 614, and the slot at slot $t_y$ minus $T_{proc,0}^{SL}$ minus $T_{proc,1}^{SL}$ 618, and the slot at slot $t_y$ plus a second threshold number of slots 318 may all be arranged and configured (or pre-configured) as in their similarly named counterparts described in relation to the scenario 500 of FIG. 5. The UE may accordingly make similar decisions (and for similar reasons) as were described in relation to the scenario 500 of FIG. 5.

One difference between FIG. 5 and FIG. 6 is that the scenario 600 illustrates a case where the existence of the SL data (and thus the location of slot n 602) was predictable prior to the slot n 602. Accordingly, the contiguous partial sensing window 610 begins prior to slot n 602 (due to this anticipation). In the scenario 600, it may be that the UE uses a 32 slot gap for aperiodic traffic. Accordingly, by beginning the window at a slot at slot $t_y$ minus $T_{proc,0}^{SL}$ minus $T_{proc,1}^{SL}$ minus 31 slots 616, the contiguous partial sensing window 610 covers an entire 32 slots that occurring prior to the periodic-based candidate slots 608, it is contemplated that a value other than 31 slots could be used in the case where a slot gap is other than 32 (e.g., the 31 corresponds more generally to slot gap−1). Thus, in the scenario 600, the UE has even more information regarding possible reservations of resources of the periodic-based candidate slots 608 than in the alternative case of the scenario 500 of FIG. 5 described above. Accordingly, the selection of SL transmission resources from the periodic-based candidate slots 608 is even more likely to avoid the inadvertent selection of a resource that is being used by another UE.

Figure 7:
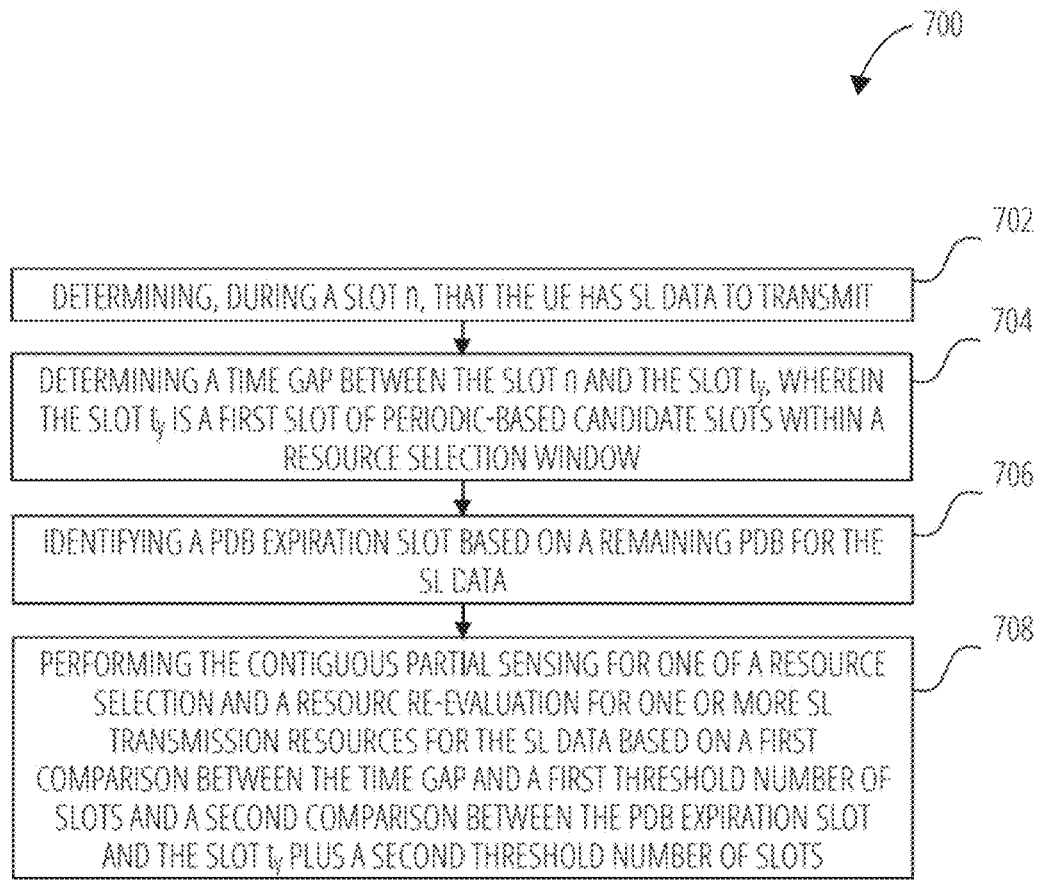
FIG. 7 illustrates a method of a UE that performs contiguous partial sensing and periodic partial sensing, according to an embodiment.

FIG. 7 illustrates a method 700 of a UE that performs contiguous partial sensing and periodic partial sensing, according to an embodiment. The method 700 includes determining 702, during a slot n, that the UE has SL data to transmit.

The method 700 further includes determining 704 a time gap between the slot n and a slot $t_y$, wherein the slot $t_y$ is a first slot of periodic-based candidate slots within a resource selection window.

The method 700 further includes identifying 706 a PDB expiration slot based on a remaining PDB for the SL data.

The method 700 further includes performing 708 the contiguous partial sensing for one of a resource selection and a resource re-evaluation for one or more SL transmission resources for the SL data based on a first comparison between the time gap and a first threshold number of slots and a second comparison between the PDB expiration slot and the slot $t_y$ plus a second threshold number of slots.

In some embodiments of the method 700, the first threshold number of slots is configured or pre-configured according to a SL resource pool configuration for the one or more SL transmission resources.

In some embodiments of the method 700, the second threshold number of slots is configured or pre-configured according to a SL resource pool configuration for the one or more SL transmission resources.

In some embodiments of the method 700, the slot $t_y$ plus the second threshold number of slots occurs during the periodic-based candidate slots.

In some embodiments of the method 700, when the time gap is larger than the first threshold number of slots and when the PDB expiration slot is before the slot $t_y$ plus the second threshold number of slots, the UE performs the contiguous partial sensing for the resource selection. In some such embodiments, the one or more SL transmission resources for the SL data occur prior to the periodic-based candidate slots. In some such embodiments, when the slot n is not predictable at the UE, the contiguous partial sensing occurs during a contiguous partial sensing window from a slot at (slot n+1 slot) to a slot at (slot n+$T_B$ slots), where $T_B$ slots is less than a number of slots from the slot n to the PDB expiration slot minus a third threshold number of slots. Further, in some cases, the third threshold number of slots is configured or pre-configured according to a SL resource pool configuration for the one or more SL transmission resources. In some such embodiments, when the slot n is predictable at the UE, the contiguous partial sensing occurs during a contiguous partial sensing window from a slot at (slot n+$T_B$ slots–31 slots) to a slot (slot n+$T_B$ slots), where $T_B$ slots is less than a number of slots from the slot n to the PDB expiration slot minus a third threshold number of slots. Further, in some cases, the third threshold number of slots is configured or pre-configured according to a SL resource pool configuration for the one or more SL transmission resources. In some such embodiments, when the slot n is predictable at the UE, the contiguous partial sensing occurs during a contiguous partial sensing window from a slot at (slot n+$t_y$ slot–31 slots) to a slot (slot n+$T_B$ slots), where $T_B$ slots is less than a number of slots from the slot n to the PDB expiration slot minus a third threshold number of slots. Further, in some cases, the third threshold number of slots is configured or pre-configured according to a SL resource pool configuration for the one or more SL transmission resources.

In some embodiments of the method 700, when the time gap is larger than the first threshold number of slots and when the PDB expiration slot is after the slot $t_y$ plus the second threshold number of slots, the performing the contiguous partial sensing for the one of the resource selection and the resource re-evaluation is further based on a time at which the UE performs resource selection relative to the contiguous partial sensing. In some such embodiments, the one or more SL transmission resources for the SL data are selected from the periodic-based candidate slots. In some such embodiments, the contiguous partial sensing occurs during a contiguous partial sensing window from a slot at (slot $t_y$–31 slots) to a slot at (slot $t_y - T_{proc,0}^{SL} - T_{proc,1}^{SL}$), where $T_{proc,0}^{SL}$ is a first number of symbols use for processing sensing results, and where $T_{proc,1}^{SL}$ is a second number of symbols used for preparing the SL data for transmission on the one or more SL transmission resources.

In some embodiments of the method 700, when the time gap is smaller than the first threshold number of slots and when the PDB expiration slot is after the slot $t_y$ plus the second threshold number of slots, the UE performs the contiguous partial sensing for the resource selection. In some such embodiments, the one or more SL transmission resources for the SL data are selected from the periodic-based candidate slots. In some such embodiments, when the slot n is not predictable at the UE, the contiguous partial sensing occurs during a contiguous partial sensing window from a slot at (slot n+1 slot) to a slot at (slot $t_y - T_{proc,0}^{SL} - T_{proc,1}^{SL}$), where $T_{proc,0}^{SL}$ is a first number of symbols use for processing sensing results, and where $T_{proc,1}^{SL}$ is a second number of symbols used for preparing the SL data for transmission on the one or more SL transmission resources. In some such embodiments, when the slot n is predictable at the UE, the contiguous partial sensing occurs during a contiguous partial sensing window from a slot at (slot $t_y - T_{proc,0}^{SL} - T_{proc,1}^{SL}$–31 slots) to a slot at (slot $t_y - T_{proc,0}^{SL} - T_{proc,1}^{SL}$), where $T_{proc,0}^{SL}$ is a first number of symbols use for processing sensing results, and where $T_{proc,1}^{SL}$ is a second number of symbols used for preparing the SL data for transmission on the one or more SL transmission resources.

Embodiments contemplated herein include an apparatus comprising means to perform one or more elements of the method 700. This apparatus may be, for example, an apparatus of a UE (such as a first wireless device 1402 that is a LE, as described herein).

Embodiments contemplated herein include one or more non-transitory computer-readable media comprising instructions to cause an electronic device, upon execution of the instructions by one or more processors of the electronic device, to perform one or more elements of the method 700. This non-transitory computer-readable media may be, for example, a memory of a UE (such as a memory 1406 of a first wireless device 1402 that is a UE, as described herein).

Embodiments contemplated herein include an apparatus comprising logic, modules, or circuitry to perform one or more elements of the method 700. This apparatus may be, for example, an apparatus of a UE (such as a first wireless device 1402 that is a UE, as described herein).

Embodiments contemplated herein include an apparatus comprising: one or more processors and one or more computer-readable media comprising instructions that, when executed by the one or more processors, cause the one or more processors to perform one or more elements of the method 700. This apparatus may be, for example, an apparatus of a UE (such as a first wireless device 1402 that is a UE, as described herein).

Embodiments contemplated herein include a signal as described in or related to one or more elements of the method 700.

Embodiments contemplated herein include a computer program or computer program product comprising instructions, wherein execution of the program by a processor is to cause the processor to carry out one or more elements of the method 700. The processor may be a processor of a UE (such as a processor(s) 1404 of a first wireless device 1402 that is a UE, as described herein). These instructions may be, for example, located in the processor and/or on a memory of the UE (such as a memory 1406 of a first wireless device 1402 that is a UE, as described herein).

In some embodiments, a UE performs contiguous partial sensing, but does not (also) perform periodic partial sensing. In such cases, as before, the UE determines that it has SL data to transmit on the SL resource pool (e.g., as provided from a higher layer of the UE) at a slot n. The SL data at the UE may have an associated remaining PDB that indicates the maximum amount of time which the UE can use to transmit the SL data. In cases where the remaining PDB is provided to the UE as an amount of time (rather than cases where it is provided in terms of slots), the UE may transform this value into the corresponding amount of slots.

Then the remaining PDB (in terms of slots) is compared to a first threshold number of slots. The first threshold number of slots is configured or pre-configured according to a SL resource pool configuration for the one or more SL transmission resources to be used. The first threshold number of slots may be configured to inform the UE whether there is sufficient time in view of the remaining PDB to perform contiguous partial sensing prior to sending the SL data.

In the case that the remaining PDB is larger than the threshold number of slots, the UE concludes that there is sufficient time to perform contiguous partial sensing prior to sending the SL data in a resource selection window. The UE may use the remaining PDB (in terms of slots) to identify a PDB expiration slot by adding this amount of slots to the slot n. Contiguous partial sensing is then performed during a contiguous partial sensing window that begins at a slot at slot n plus one slot and that ends at a slot at slot n plus $T_B$ slots, where $T_B$ is less than a minimum of 1) a number of slots from the slot n to the PDB expiration slot minus a second threshold number of slots and 2) 31 slots (or alternatively 32 slots–$T_{proc,0}^{SL}$, where $T_{proc,0}^{SL}$ is a processing time for the sensing results of the contiguous partial sensing window). The second threshold number of slots is configured or pre-configured according to a SL resource pool configuration for the one or more SL transmission resources to be used. The second threshold number of slots may be configured (or pre-configured) to be large enough to ensure that there are sufficient resources prior to the PDB expiration slot that can be used to perform resource selection for the SL transmission.

Due to the contiguous partial sensing, the UE is aware of the reservation status of at least some of the resources of the resource selection window. Accordingly, the UE uses any of this reservation status information corresponding to any resources of the resource selection window to help inform a selection of SL transmission resources from the resource selection window (e.g., the UE avoids selecting any resources from the resource selection window that it knows to be reserved due to the sensing performed during the contiguous partial sensing window). The SL data is then sent using the selected SL transmission resources.

It is contemplated that in some such cases, one or more additional uses of contiguous partial sensing could also be performed for resource re-evaluation.

In the case that the remaining PDB is smaller than or equal to the threshold number of slots, the UE concludes that there is not sufficient time to perform contiguous partial sensing prior to sending the data in a resource selection window. Accordingly, the UE may, for example, perform random resource selection in the resource selection window instead. The SL data is then sent using the selected SL transmission resources.

Figure 8:
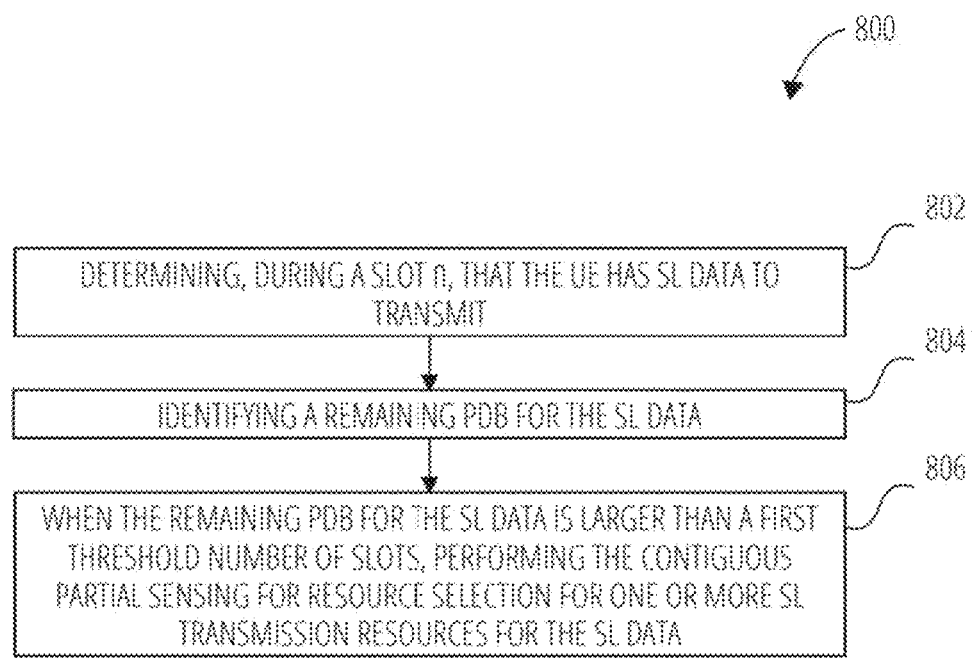
FIG. 8 illustrates a method of a UE that performs contiguous partial sensing, according to an embodiment.

FIG. 8 illustrates a method 800 of a UE that performs contiguous partial sensing, according to an embodiment. The method 800 includes determining 802, during a slot n, that the UE has SL data to transmit.

The method 800 further includes identifying 804 a remaining PDB for the SL data.

The method 800 further includes, when the remaining PDB for the SL data is larger than a first threshold number of slots, performing 806 the contiguous partial sensing for resource selection for one or more SL transmission resources for the SL data.

In some embodiments of the method 800, the first threshold number of slots is configured or pre-configured according to a SL resource pool configuration for the one or more SL transmission resources.

In some embodiments, the method 800 further includes identifying a PDB expiration slot based on the remaining PDB; and the contiguous partial sensing is performed during a contiguous partial sensing window from a slot at (slot n+1 slot) to a slot at (slot n+$T_B$ slots), where $T_B$ slots is less than a minimum of 31 slots and a number of slots from the slot n to the PDB expiration slot minus a second threshold number of slots. In some cases, the second threshold number of slots is configured or pre-configured according to a SL resource pool configuration for the one or more SL transmission resources.

In some embodiments, the method 800 further includes performing second contiguous partial sensing for resource re-evaluation.

Embodiments contemplated herein include an apparatus comprising means to perform one or more elements of the method 800. This apparatus may be, for example, an apparatus of a UE (such as a first wireless device 1402 that is a UE, as described herein).

Embodiments contemplated herein include one or more non-transitory computer-readable media comprising instructions to cause an electronic device, upon execution of the instructions by one or more processors of the electronic device, to perform one or more elements of the method 800. This non-transitory computer-readable media may be, for example, a memory of a UE (such as a memory 1406 of a first wireless device 1402 that is a UE, as described herein).

Embodiments contemplated herein include an apparatus comprising logic, modules, or circuitry to perform one or more elements of the method 800. This apparatus may be, for example, an apparatus of a UE (such as a first wireless device 1402 that is a UE, as described herein).

Embodiments contemplated herein include an apparatus comprising: one or more processors and one or more computer-readable media comprising instructions that, when executed by the one or more processors, cause the one or more processors to perform one or more elements of the method 800. This apparatus may be, for example, an apparatus of a UE (such as a first wireless device 1402 that is a UTE, as described herein).

Embodiments contemplated herein include a signal as described in or related to one or more elements of the method 800.

Embodiments contemplated herein include a computer program or computer program product comprising instructions, wherein execution of the program by a processor is to cause the processor to carry out one or more elements of the method 800. The processor may be a processor of a UE (such as a processor(s) 1404 of a first wireless device 1402 that is a UE, as described herein). These instructions may be, for example, located in the processor and/or on a memory of the UE (such as a memory 1406 of a first wireless device 1402 that is a UE, as described herein).

Figure 9:
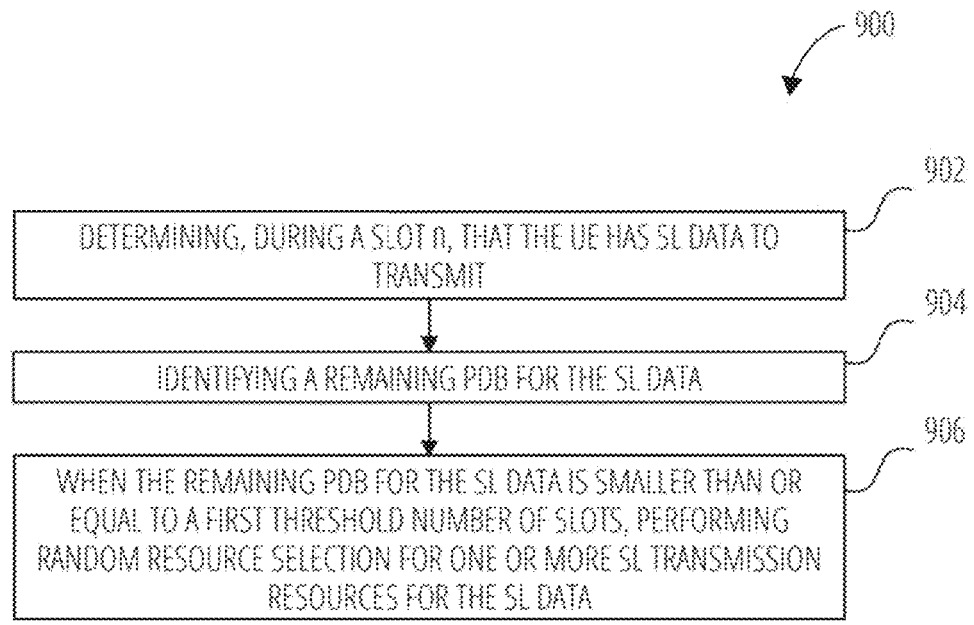
FIG. 9 illustrates a method of a UE that performs random resource selection, according to an embodiment.

FIG. 9 illustrates a method 900 of a UE that performs random resource selection, according to an embodiment. The method 900 includes determining 902, during a slot n, that the UE has SL data to transmit.

The method 900 further includes identifying 904 a remaining PDB for the SL data.

The method 900 further includes, when the remaining PDB for the SL data is smaller than or equal to a first threshold number of slots, performing 906 random resource selection for one or more SL transmission resources for the SL data.

Embodiments contemplated herein include an apparatus comprising means to perform one or more elements of the method 900. This apparatus may be, for example, an apparatus of a UE (such as a first wireless device 1402 that is a UE, as described herein).

Embodiments contemplated herein include one or more non-transitory computer-readable media comprising instructions to cause an electronic device, upon execution of the instructions by one or more processors of the electronic device, to perform one or more elements of the method 900. This non-transitory computer-readable media may be, for example, a memory of a UE (such as a memory 1406 of a first wireless device 1402 that is a UE, as described herein).

Embodiments contemplated herein include an apparatus comprising logic, modules, or circuitry to perform one or more elements of the method 900. This apparatus may be, for example, an apparatus of a UE (such as a first wireless device 1402 that is a UE, as described herein).

Embodiments contemplated herein include an apparatus comprising: one or more processors and one or more computer-readable media comprising instructions that, when executed by the one or more processors, cause the one or more processors to perform one or more elements of the method 900. This apparatus may be, for example, an apparatus of a UE (such as a first wireless device 1402 that is a UE, as described herein).

Embodiments contemplated herein include a signal as described in or related to one or more elements of the method 900.

Embodiments contemplated herein include a computer program or computer program product comprising instructions, wherein execution of the program by a processor is to cause the processor to carry out one or more elements of the method 900. The processor may be a processor of a UE (such as a processor(s) 1404 of a first wireless device 1402 that is a UE, as described herein). These instructions may be, for example, located in the processor and for on a memory of the UE (such as a memory 1406 of a first wireless device 1402 that is a UE, as described herein).

In some instances, it may be that a UE uses periodic partial sensing to perform resource re-evaluation and/or resource pre-emption. In such cases, the sensing occasions (of the periodic partial sensing) for the resource re-evaluation or resource pre-emption may follow a set of periodicities that is understood separately from, for example, any set of periodicities used for resource selection. For example, while a set of periodicities for resources selection may be understood corresponding to periodicity values in $P_{reserve}$ as previously described, one or more periodicity values used for resource re-evaluation and/or resource pre-emption may be separately defined/understood as $P_{reserve,re-ev}$. In other words, $P_{reserve,re-ev}$ may represent the set of periodicity values corresponding to periodicities to be monitored as part of the resource re-evaluation and/or resource pre-emption. It is contemplated that there $P_{reserve}$ and $P_{reserve,re-ev}$ may to some extent have overlapping values (and that they may even have the same values in some cases).

Figure 10:
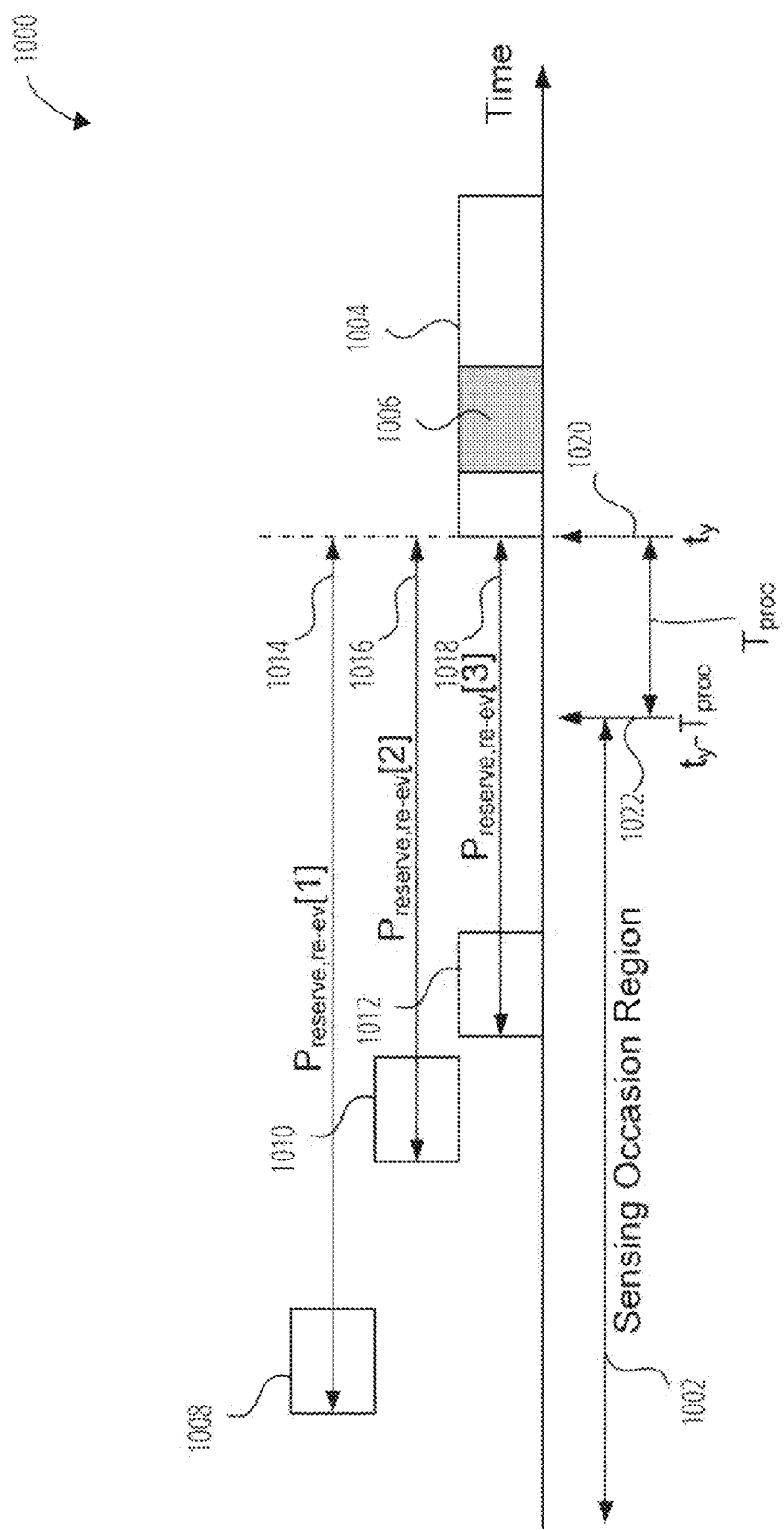
FIG. 10 illustrates a scenario showing the use of P values, according to an embodiment

FIG. 10 illustrates a scenario 1000 showing the use of $P_{reserve,re-ev}$ values, according to an embodiment. A UE may have performed resource selection and has selected the selected resources 1006 from the periodic-based candidate slots 1004. Once the resource selection is performed, the UE may then be triggered to perform resource re-evaluation and/or resource pre-emption prior to the slot $t_y$ 1020 (the first slot of the periodic-based candidate slots 1004). In some cases, the act of resource selection itself as the resource re-evaluation and/or resource pre-emption trigger. The UE may perform such resource re-evaluation and/or resource pre-emption based on any reservation information from other UEs that is detected during monitoring occasions corresponding to $P_{reserve,re-ev}$ values known to the IE.

In the scenario 1000, the UE uses the first sensing occasion 1008 corresponding to a period 1014 of a first periodicity of a first periodicity value of $P_{reserve,re-ev}$, the second sensing occasion 1010 corresponding to a period 1016 of a second periodicity of second periodicity value of $P_{reserve,re-ev}$, and the third sensing occasion 1012 corresponding to a period 1018 of a third periodicity of a third periodicity value of $P_{reserve,re-ev}$. Each of these occur during the indicated sensing occasion region 1002. Based on reservation information so gathered during the first sensing occasion 1008, the second sensing occasion 1010, and/or the third sensing occasion 1012, the UE may perform the resource re-evaluation and/or resource pre-emption to modify its use of the selected resources 1006 (e.g., drop some or all of the selected resources 1006 and perhaps select different resources from the periodic-based candidate slots 1004 instead).

As illustrated, it may be that the UE uses monitoring occasions corresponding to $P_{reserve,re-ev}$ periodicity values that occur prior to a slot at slot $t_y$ minus $T_{proc}$ 1022, where $T_{proc}$ represents a processing time for the resource re-evaluation and/or resource pre-emption. The slot at slot $t_y$ minus $T_{proc}$ 1022 may be understood in some cases to be a restriction on the usable sensing occasions for the resource re-evaluation and/or resource pre-emption (e.g., because the UE knows that resource selection has previously occurred, and that this is the latest point at which the resource re-evaluation and/or resource pre-emption may be processed prior to the slot $t_y$ 1020).

In some embodiments, it may be that $P_{reserve,re-ev}$ is equal to the configured (or pre-configured) set sl-ResourceReservePeriodList (where sl-ResourceReservePeriodList includes all supported periodicities of the SL resource pool). In other embodiments, it may be that $P_{reserve,re-ev}$ is a subset of the set sl-ResourceReservePeriodList, where the subset is (also) configured (or pre-configured) at the UE. For example, in some such cases, it may be that $P_{reserve,re-ev}$ is equal to $P_{reserve}$ (where $P_{reserve}$ represents a subset of sl-ResourceReservePeriodList). In other such cases, it may be that $P_{reserve,re-ev}$ is equal to $P_{reserve}$ in addition to the periodicity value $P_{rsvp_{TX}}$, where $P_{rsvp_{TX}}$ is a data periodicity value determined at the UE based on UE traffic (and that is also found in sl-ResourceReservePeriodList). The use of $P_{rsvp_{TX}}$ to perform monitoring in this fashion may help alleviate a case where the UE and another UE would otherwise continually interfere with each other (due to a same $P_{reserve,re-ev}$ at each UE). In other such cases, it may be that $P_{reserve,re-ev}$ is configured without using $P_{reserve}$ (though there may be coincidental overlap (even complete overlap) in values between the two). In some embodiments, if $P_{reserve,re-ev}$ is not configured (or pre-configured) at the UE, then the UE understands that $P_{reserve,re-ev}$ is equal to the set sl-ResourceReservePeriodList; otherwise, $P_{reserve,re-ev}$ is instead based on the configuration (or pre-configuration) for the same, as described above.

One or more sensing occasions according to periodicities of the periodicity values of $P_{reserve,re-ev}$ may be further identified using period definition data $K_{re-ev}$. The $K_{re-ev}$ may identify the one or more periods of the periodicities corresponding to the periodicity values in $P_{reserve,re-ev}$ for which sensing occasions are to be monitored. In a first case, $K_{re-ev}$ indicates that the most recent sensing occasion prior to a resource re-evaluation and/or resource pre-emption restriction should be used. This is the case illustrated by the scenario 1000, with the slot at slot $t_y$ minus $T_{proc}$ 1022 acting as the restriction as previously described.

In a second case, $K_{re-ev}$ is configured with one or more values for particular periodicities according to the values in $P_{reserve,re-ev}$. In some cases, $K_{re-ev}$ is equal to K, where K indicates periodicities for sensing occasions for resource selection according to a set of periodicity values in $P_{reserve}$. In other cases, $K_{re-ev}$ is configured separately from K (though values in each may coincidentally overlap/fully overlap).

In a third case, if $K_{re-ev}$ is not configured (or pre-configured), then $K_{re-ev}$ may be understood to correspond to the most recent sensing occasion prior to a resource re-evaluation and/or resource pre-emption restriction. Otherwise, $K_{re-ev}$ is as configured (or pre-configured).

Examples of the ways to indicate $K_{re-ev}$ are now provided. A $K_{re-ev}$ value may indicate that each value in $P_{reserve,re-ev}$ should be used for, for example, three (most recent) periods, with each such period corresponding to a sensing occasion. Accordingly, an adjusted scenario 1000 would include nine total sensing occasions in such a case (with the sensing occasions occurring at each of three periods measured back from $t_y$ for each periodicity having a periodicity value in $P_{reserve,re-ev}$). Such a case may be provided in multiple manners. For example, this case may be given by an indication of $K_{re-ev}=3$ (where the use of every integer value less than the given 3 is assumed), or the case of $K_{re-ev}=\{1, 2, 3\}$ where a more explicit indication is instead used. A bitmap $K_{re-ev}=[1, 1, 1]$ could also be used for the same result.

It is also contemplated that $K_{re-ev}$ could indicate individual periods in a non-consecutive fashion. For example, for $\{1, 4, 6\}$, the first, fourth, and sixth periods back from $t_y$ according to each of the period 1014, the period 1016, and the period 1018 could correspond to an active sensing occasion. A bitmap $K_{re-ev}=[1, 0, 0, 1, 0, 1]$ could also be used for the same result.

Figure 11:
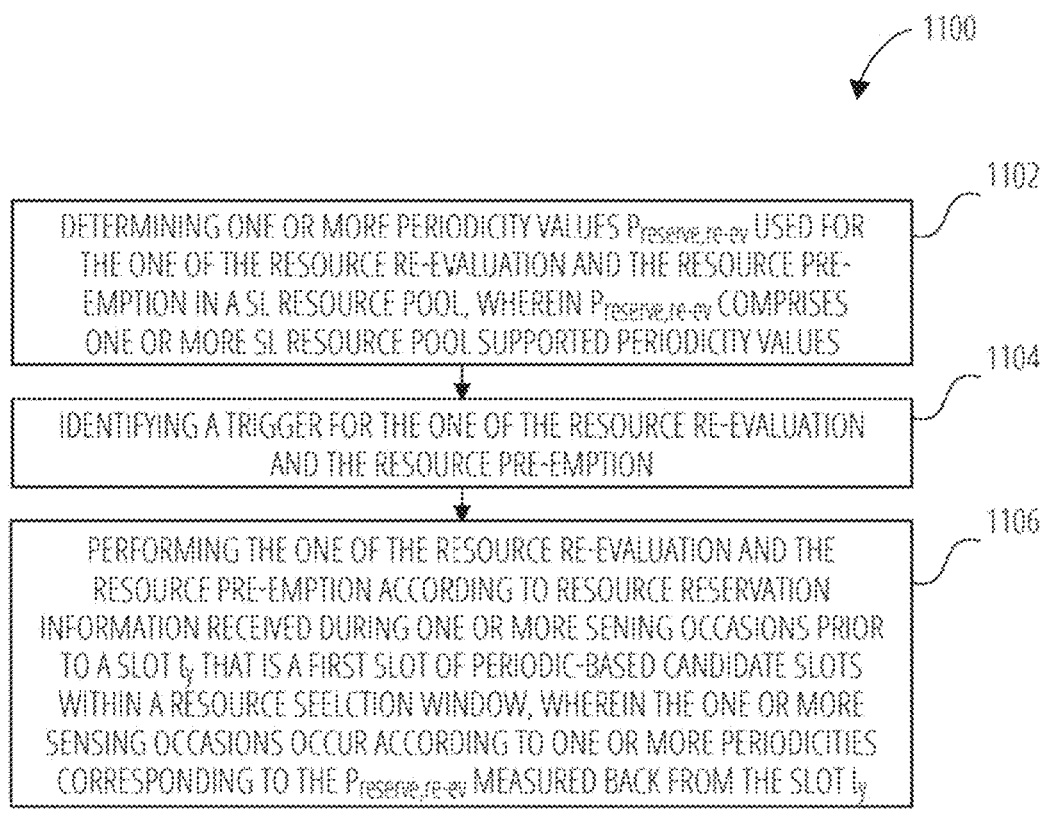
FIG. 11 illustrates a method of a UE that performs one or resource re-evaluation and resource pre-emption with periodic partial sensing, according to an embodiment.

FIG. 11 illustrates a method 1100 of a UE that performs one or resource re-evaluation and resource pre-emption with periodic partial sensing, according to an embodiment. The method 1100 includes determining 1102 one or more periodicity values $P_{reserve,re-ev}$ used for the one of the resource re-evaluation and the resource pre-emption in a SL resource pool, wherein $P_{reserve,re-ev}$ comprises one or more SL resource pool supported periodicity values.

The method 1100 further includes identifying 1104 a trigger for the one of the resource re-evaluation and the resource pre-emption.

The method 1100 further includes performing 1106 the one of the resource re-evaluation and the resource pre-emption according to resource reservation information received during one or more sensing occasions prior to a slot $t_y$ that is a first slot of periodic-based candidate slots within a resource selection window, wherein the one or more sensing occasions occur according to one or more periodicities corresponding to the $P_{reserve,re-ev}$ measured back from the slot $t_y$.

In some embodiments of the method 1100, the one or more SL resource pool supported periodicity values comprises all SL resource pool supported periodicity values for the SL resource pool.

In some embodiments of the method 1100, the one or more SL resource pool supported periodicity values comprises periodicity values used with the SL resource pool for resource selection. In some such embodiments, $P_{reserve,re-ev}$ further comprises a data periodicity value determined at the UE based on UE traffic.

In some embodiments of the method 1100, $P_{reserve,re-ev}$ is pre-configured at the UE.

In some embodiments, the method 1100 further includes identifying the one or more sensing occasions using period definition data $K_{re-ev}$ for the one of the resource re-evaluation and resource pre-emption that indicates one or more periods of each of the one or more periodicities during which the one or more sensing occasions occur. In some such embodiments, the one or more periods includes a first period of each of the one or more periodicities occurring prior to a restriction time for the one or more sensing occasions. In some such embodiments, $K_{re-ev}$ is equal to period definition data K used to identify sensing occasions for resource selection. In some such embodiments, $K_{re-ev}$ is pre-configured at the UE.

Embodiments contemplated herein include an apparatus comprising means to perform one or more elements of the method 1100. This apparatus may be, for example, an apparatus of a UE (such as a first wireless device 1402 that is a UE, as described herein).

Embodiments contemplated herein include one or more non-transitory computer-readable media comprising instructions to cause an electronic device, upon execution of the instructions by one or more processors of the electronic device, to perform one or more elements of the method 1100. This non-transitory computer-readable media may be, for example, a memory of a UE (such as a memory 1406 of a first wireless device 1402 that is a UE, as described herein).

Embodiments contemplated herein include an apparatus comprising logic, modules, or circuitry to perform one or more elements of the method 1100. This apparatus may be, for example, an apparatus of a UE (such as a first wireless device 1402 that is a UE, as described herein).

Embodiments contemplated herein include an apparatus comprising: one or more processors and one or more computer-readable media comprising instructions that, when executed by the one or more processors, cause the one or more processors to perform one or more elements of the method 1100. This apparatus may be, for example, an apparatus of a UE (such as a first wireless device 1402 that is a UE, as described herein).

Embodiments contemplated herein include a signal as described in or related to one or more elements of the method 1100.

Embodiments contemplated herein include a computer program or computer program product comprising instructions, wherein execution of the program by a processor is to cause the processor to carry out one or more elements of the method 1100. The processor may be a processor of a UE (such as a processor(s) 1404 of a first wireless device 1402 that is a UE, as described herein). These instructions may be, for example, located in the processor and/or on a memory of the UE (such as a memory 1406 of a first wireless device 1402 that is a UE, as described herein).

In some cases, there may be a restriction at the UE on the use of random resource selection, in order to avoid continuous collision between, for example, two non-sensing UE, or between a no sensing UE and a full/partial sensing UE. In such a case, the UE may be restricted to only select resources for transmission for a single transport block (TB). It may also be that no resource reservation periods are allowed in such cases.

Figure 12:
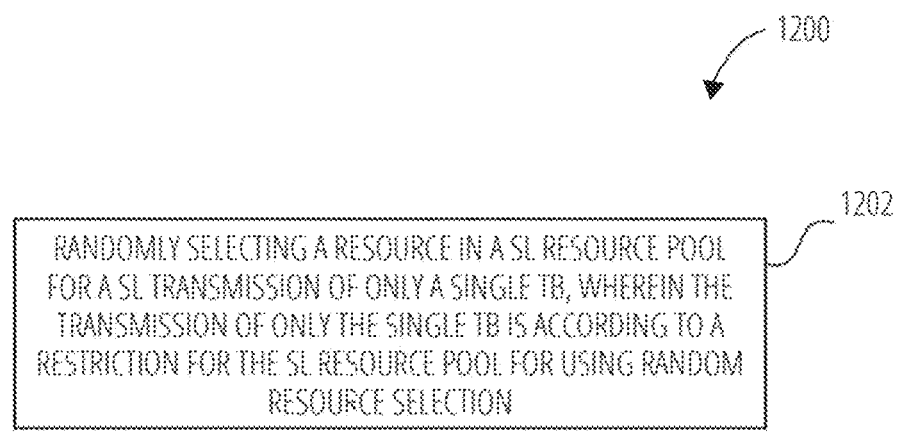
FIG. 12 illustrates a method of a UE for performing random resource selection, according to an embodiments.

FIG. 12 illustrates a method 1200 of a UE for performing random resource selection, according to an embodiments. The method 1200 includes randomly selecting 1202 a resource in a SL resource pool for a SL transmission of only a single TB, wherein the transmission of only the single TB is according to a restriction for the SL resource pool for using random resource selection.

Embodiments contemplated herein include an apparatus comprising means to perform one or more elements of the method 1200. This apparatus may be, for example, an apparatus of a UE (such as a first wireless device 1402 that is a UE, as described herein).

Embodiments contemplated herein include one or more non-transitory computer-readable media comprising instructions to cause an electronic device, upon execution of the instructions by one or more processors of the electronic device, to perform one or more elements of the method 1200. This non-transitory computer-readable media may be, for example, a memory of a UE (such as a memory 1406 of a first wireless device 1402 that is a UE, as described herein).

Embodiments contemplated herein include an apparatus comprising logic, modules, or circuitry to perform one or more elements of the method 1200. This apparatus may be, for example, an apparatus of a UE (such as a first wireless device 1402 that is a UE, as described herein).

Embodiments contemplated herein include an apparatus comprising: one or more processors and one or more computer-readable media comprising instructions that, when executed by the one or more processors, cause the one or more processors to perform one or more elements of the method 1200. This apparatus may be, for example, an apparatus of a UE (such as a first wireless device 1402 that is a UE, as described herein).

Embodiments contemplated herein include a signal as described in or related to one or more elements of the method 1200.

Embodiments contemplated herein include a computer program or computer program product comprising instructions, wherein execution of the program by a processor is to cause the processor to carry out one or more elements of the method 1200. The processor may be a processor of a UE (such as a processor(s) 1404 of a first wireless device 1402 that is a UE, as described herein). These instructions may be, for example, located in the processor and/or on a memory of the UE (such as a memory 1406 of a first wireless device 1402 that is a UE, as described herein).

Figure 13:
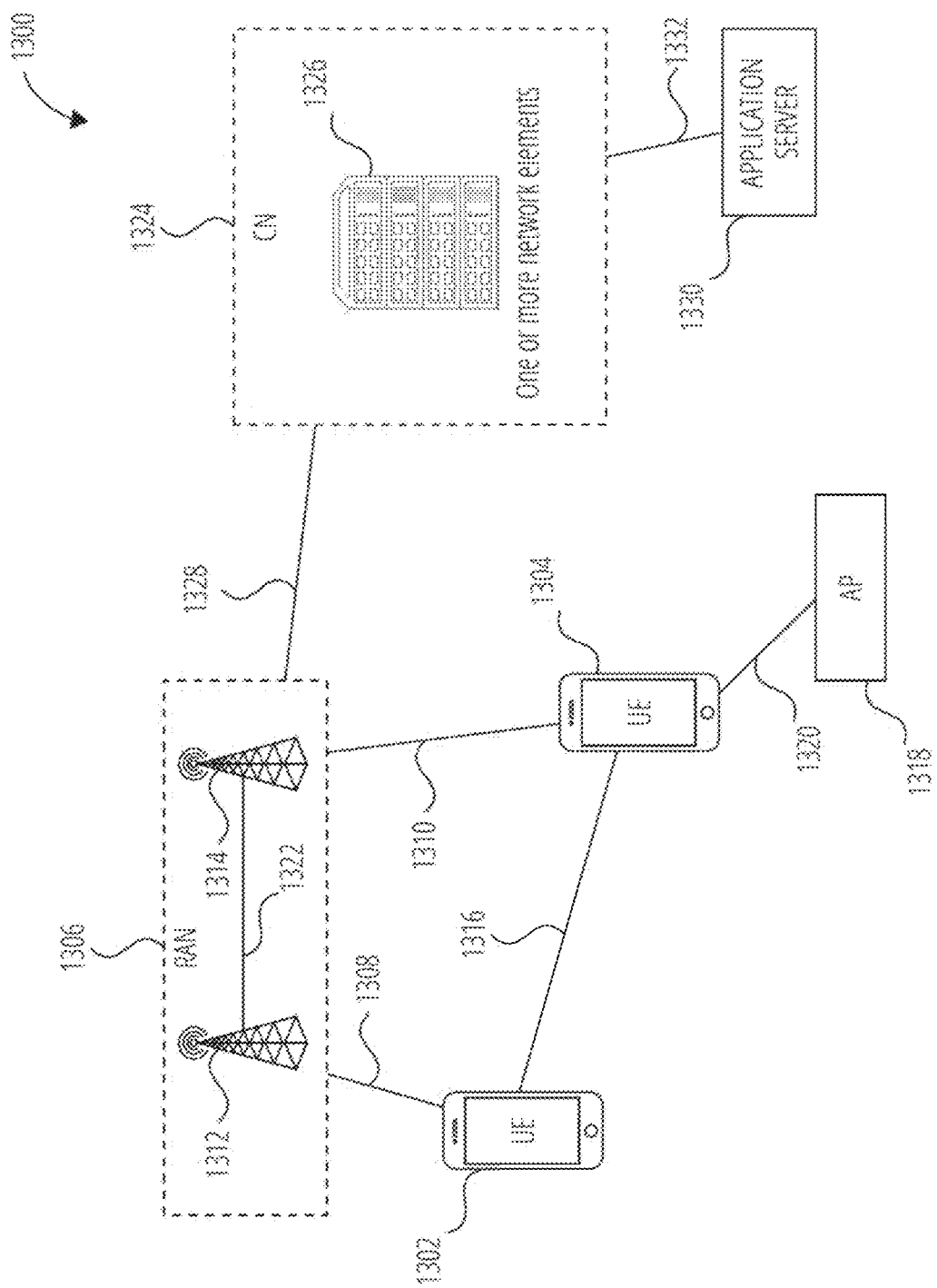
FIG. 13 illustrates an example architecture of a wireless communication system, according to embodiments disclosed herein.

FIG. 13 illustrates an example architecture of a wireless communication system 1300, according to embodiments disclosed herein. The following description is provided for an example wireless communication system 1300 that operates in conjunction with the LTE system standards and/or 5G or NR system standards as provided by 3GPP technical specifications.

As shown by FIG. 13, the wireless communication system 1300 includes UE 1302 and UE 1304 (although any number of UEs may be used). In this example, the UE 1302 and the UE 1304 are illustrated as smartphones (e.g., handheld touchscreen mobile computing devices connectable to one or more cellular networks), but may also comprise any mobile or non-mobile computing device configured for wireless communication.

The UE 1302 and UE 1304 may be configured to communicatively couple with a RAN 1306. In embodiments, the RAN 1306 may be NG-RAN, E-UTRAN, etc. The UE 1302 and UE 1304 utilize connections (or channels) (shown as connection 1308 and connection 1310, respectively) with the RAN 1306, each of which comprises a physical communications interface. The RAN 1306 can include one or more base stations, such as base station 1312 and base station 1314, that enable the connection 1308 and connection 1310.

In this example, the connection 1308 and connection 1310 are air interfaces to enable such communicative coupling, and may be consistent with RAT(s) used by the RAN 1306, such as, for example, an LTE and/or NR.

In some embodiments, the UE 1302 and UE 1304 may also directly exchange communication data via a sidelink interface 1316. The UE 1304 is shown to be configured to access an access point (shown as AP 1318) via connection 1320. By way of example, the connection 1320 can comprise a local wireless connection, such as a connection consistent with any IEEE 1302.11 protocol, wherein the AP 1318 may comprise a Wi-Fi® router. In this example, the AP 1318 may be connected to another network (for example, the Internet) without going through a CN 1324.

In embodiments, the UE 1302 and UE 1304 can be configured to communicate using orthogonal frequency division multiplexing (OFDM) communication signals with each other or with the base station 1312 and/or the base station 1314 over a multicarrier communication channel in accordance with various communication techniques, such as, but not limited to, an orthogonal frequency division multiple access (OFDMA) communication technique (e.g., for downlink communications) or a single carrier frequency division multiple access (SC-FDMA) communication technique (e.g., for uplink and ProSe or sidelink communications), although the scope of the embodiments is not limited in this respect. The OFDM signals can comprise a plurality of orthogonal subcarriers.

In some embodiments, all or parts of the base station 1312 or base station 1314 may be implemented as one or more software entities running on server computers as part of a virtual network. In addition, or in other embodiments, the base station 1312 or base station 1314 may be configured to communicate with one another via interface 1322. In embodiments where the wireless communication system 1300 is an LTE system (e.g., when the CN 1324 is an EPC), the interface 1322 may be an X2 interface. The X2 interface may be defined between two or more base stations (e.g., two or more eNBs and the like) that connect to an EPC, and/or between two eNBs connecting to the EPC. In embodiments where the wireless communication system 1300 is an NR system (e.g., when CN 1324 is a 5GC), the interface 1322 may be an Xn interface. The Xn interface is defined between two or more base stations (e.g., two or more gNBs and the like) that connect to 5GC, between a base station 1312 (e.g., a gNB) connecting to 5GC and an eNB, and/or between two eNBs connecting to 5GC (e.g., CN 1324).

The RAN 1306 is shown to be communicatively coupled to the CN 1324. The CN 1324 may comprise one or more network elements 1326, which are configured to offer various data and telecommunications services to customers/subscribers (e.g., users of UE 1302 and UE 1304) who are connected to the CN 1324 via the RAN 1306. The components of the CN 1324 may be implemented in one physical device or separate physical devices including components to read and execute instructions from a machine-readable or computer-readable medium (e.g., a non-transitory machine-readable storage medium).

In embodiments, the CN 1324 may be an EPC, and the RAN 1306 may be connected with the CN 1324 via an S1 interface 1328. In embodiments, the S1 interface 1328 may be split into two parts, an S1 user plane (S1-U) interface, which carries traffic data between the base station 1312 or base station 1314 and a serving gateway (S-GW), and the S1-MME interface, which is a signaling interface between the base station 1312 or base station 1314 and mobility management entities (MMEs).

In embodiments, the CN 1324 may be a 5GC, and the RAN 1306 may be connected with the CN 1324 via an NG interface 1328. In embodiments, the NG interface 1328 may be split into two parts, an NG user plane (NG-U) interface, which carries traffic data between the base station 1312 or base station 1314 and a user plane function (UPF), and the S1 control plane (NG-C) interface, which is a signaling interface between the base station 1312 or base station 1314 and access and mobility management functions (AMFs).

Generally, an application server 1330 may be an element offering applications that use internet protocol (IP) bearer resources with the CN 1324 (e.g., packet switched data services). The application server 1330 can also be configured to support one or more communication services (e.g., VoIP sessions, group communication sessions, etc.) for the UE 1302 and UE 1304 via the CN 1324. The application server 1330 may communicate with the CN 1324 through an IP communications interface 1332.

Figure 14:
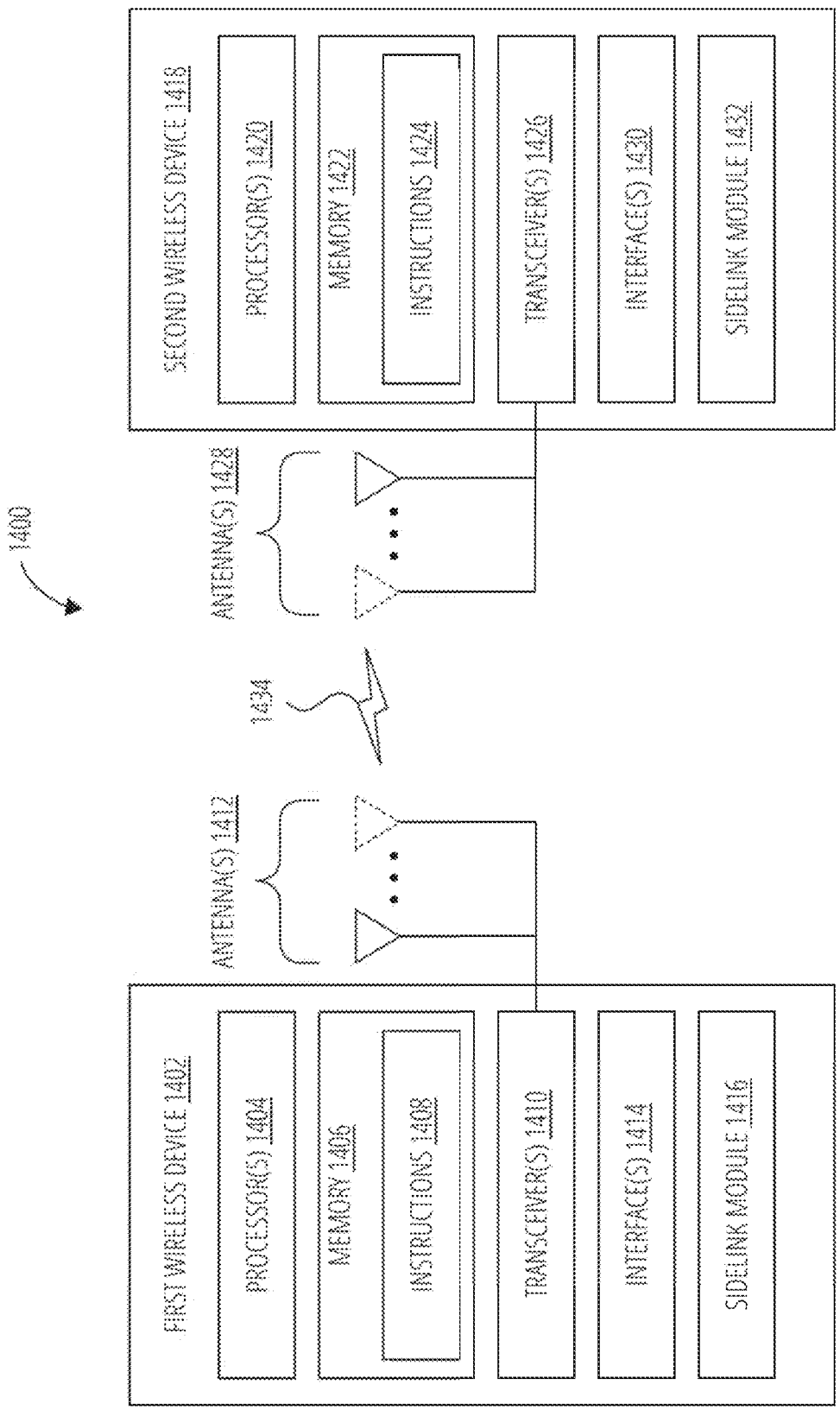
FIG. 14 illustrates a system for performing signaling between a first wireless device and a second wireless device, according to embodiments disclosed herein.

FIG. 14 illustrates a system 1400 for performing signaling 1434 between a first wireless device 1402 and a second wireless device 1418, according to embodiments disclosed herein. The system 1400 may be a portion of a wireless communications system as herein described. The first wireless device 1402 may be, for example, a UE of a wireless communication system. The second wireless device 1418 may be, for example, a IE of the wireless communication system.

The first wireless device 1402 may include one or more processor(s) 1404. The processor(s) 1404 may execute instructions such that various operations of the first wireless device 1402 are performed, as described herein. The processor(s) 1404 may include one or more baseband processors implemented using, for example, a central processing unit (CPU), a digital signal processor (DSP), an application specific integrated circuit (ASIC), a controller, a field programmable gate array (FPGA) device, another hardware device, a firmware device, or any combination thereof configured to perform the operations described herein.

The first wireless device 1402 may include a memory 1406. The memory 1406 may be a non-transitory computer-readable storage medium that stores instructions 1408 (which may include, for example, the instructions being executed by the processor(s) 1404). The instructions 1408 may also be referred to as program code or a computer program. The memory 1406 may also store data used by, and results computed by, the processor(s) 1404.

The first wireless device 1402 may include one or more transceiver(s) 1410 that may include radio frequency (RF) transmitter and/or receiver circuitry that use the antenna(s) 1412 of the first wireless device 1402 to facilitate signaling (e.g., the signaling 1434) to and/or from the first wireless device 1402 with other devices (e.g., the second wireless device 1418) according to corresponding RATs.

The first wireless device 1402 may include one or more antenna(s) 1412 (e.g., one, two, four, or more). For embodiments with multiple antenna(s) 1412, the first wireless device 1402 may leverage the spatial diversity of such multiple antenna(s) 1412 to send and/or receive multiple different data streams on the same time and frequency resources. This behavior may be referred to as, for example, multiple input multiple output (MIMO) behavior (referring to the multiple antennas used at each of a transmitting device and a receiving device that enable this aspect). MIMO transmissions by the first wireless device 1402 may be accomplished according to precoding (or digital beamforming) that is applied at the first wireless device 1402 that multiplexes the data streams across the antenna(s) 1412 according to known or assumed channel characteristics such that each data stream is received with an appropriate signal strength relative to other streams and at a desired location in the spatial domain (e.g., the location of a receiver associated with that data stream). Certain embodiments may use single user MIMO (SU-MIMO) methods (where the data streams are all directed to a single receiver) and/or multi user MIMO (MU-MIMO) methods (where individual data streams may be directed to individual (different) receivers in different locations in the spatial domain).

In certain embodiments having multiple antennas, the first wireless device 1402 may implement analog beamforming techniques, whereby phases of the signals sent by the antenna(s) 1412 are relatively adjusted such that the (joint) transmission of the antenna(s) 1412 can be directed (this is sometimes referred to as beam steering).

The first wireless device 1402 may include one or more interface(s) 1414. The interface(s) 1414 may be used to provide input to or output from the first wireless device 1402. For example, a first wireless device 1402 that is a UE may include interface(s) 1414 such as microphones, speakers, a touchscreen, buttons, and the like in order to allow for input and/or output to the UE by a user of the UE. Other interfaces of such a UE may be made up of transmitters, receivers, and other circuitry (e.g., other than the transceiver(s) 1410/antenna(s) 1412 already described) that allow for communication between the UE and other devices and may operate according to known protocols (e.g., Wi-Fi®, Bluetooth®, and the like).

The first wireless device 1402 may include a sidelink module 1416. The sidelink module 1416 may be implemented via hardware, software, or combinations thereof. For example, the sidelink module 1416 may be implemented as a processor, circuit, and/or instructions 1408 stored in the memory 1406 and executed by the processor(s) 1404. In some examples, the sidelink module 1416 may be integrated within the processor(s) 1404 and/or the transceiver(s) 1410. For example, the sidelink module 1416 may be implemented by a combination of software components (e.g., executed by a DSP or a general processor) and hardware components (e.g., logic gates and circuitry) within the processor(s) 1404 or the transceiver(s) 1410.

The sidelink module 1416 may be used for various aspects of the present disclosure, for example, aspects of FIG. 1 to FIG. 12. For example, the sidelink module 1416 may configure the first wireless device 1402 to perform contiguous partial sensing in addition to periodic partial sensing as described herein, perform contiguous partial sensing without additional periodic partial sensing as described herein, perform periodic partial sensing for resource re-evaluation and/or resource pre-emption as described herein, and/or perform random resource selection as described herein.

The second wireless device 1418 may include one or more processor(s) 1420. The processor(s) 1420 may execute instructions such that various operations of the second wireless device 1418 are performed, as described herein. The processor(s) 1420 may include one or more baseband processors implemented using, for example, a CPU, a DSP, an ASIC, a controller, an FPGA device, another hardware device, a firmware device, or any combination thereof configured to perform the operations described herein.

The second wireless device 1418 may include a memory 1422. The memory 1422 may be a non-transitory computer-readable storage medium that stores instructions 1424 (which may include, for example, the instructions being executed by the processor(s) 1420). The instructions 1424 may also be referred to as program code or a computer program. The memory 1422 may also store data used by, and results computed by, the processor(s) 1420.

The second wireless device 1418 may include one or more transceiver(s) 1426 that may include RF transmitter and/or receiver circuitry that use the antenna(s) 1428 of the second wireless device 1418 to facilitate signaling (e.g., the signaling 1434) to and/or from the second wireless device 1418 with other devices (e.g., the first wireless device 1402) according to corresponding RATs.

The second wireless device 1418 may include one or more antenna(s) 1428 (e.g., one, two, four, or more). In embodiments having multiple antenna(s) 1428, the second wireless device 1418 may perform MIMO, digital beamforming, analog beamforming, beam steering, etc., as has been described.

The second wireless device 1418 may include one or more interface(s) 1430. The interface(s) 1430 may be used to provide input to or output from the second wireless device 1418. For example, a second wireless device 1418 that is a UE may include interface(s) 1430 such as microphones, speakers, a touchscreen, buttons, and the like in order to allow for input and/or output to the UE by a user of the UE. Other interfaces of such a UE may be made up of transmitters, receivers, and other circuitry (e.g., other than the transceiver(s) 1426/antenna(s) 1428 already described) that allow for communication between the UE and other devices and may operate according to known protocols (e.g., Wi-Fi®, Bluetooth®, and the like).

The second wireless device 1418 may include a sidelink module 1432. The sidelink module 1432 may be implemented via hardware, software, or combinations thereof. For example, the sidelink module 1432 may be implemented as a processor, circuit, and/or instructions 1424 stored in the memory 1422 and executed by the processor(s) 1420. In some examples, the sidelink module 1432 may be integrated within the processor(s) 1420 and/or the transceiver(s) 1426. For example, the sidelink module 1432 may be implemented by a combination of software components (e.g., executed by a DSP or a general processor) and hardware components (e.g., logic gates and circuitry) within the processor(s) 1420 or the transceiver(s) 1426.

The sidelink module 1432 may be used for various aspects of the present disclosure, for example, aspects of FIG. 1 through FIG. 12. For example, the sidelink module 1432 may configure the second wireless device 1418 to perform contiguous partial sensing in addition to periodic partial sensing as described herein, perform contiguous partial sensing without additional periodic partial sensing as described herein, perform periodic partial sensing for resource re-evaluation and/or resource pre-emption as described herein, and/or perform random resource selection as described herein.

For one or more embodiments, at least one of the components set forth in one or more of the preceding figures may be configured to perform one or more operations, techniques, processes, and/or methods as set forth herein. For example, a baseband processor as described herein in connection with one or more of the preceding figures may be configured to operate in accordance with one or more of the examples set forth herein. For another example, circuitry associated with a UE, base station, network element, etc. as described above in connection with one or more of the preceding figures may be configured to operate in accordance with one or more of the examples set forth herein.

Any of the above described embodiments may be combined with any other embodiment (or combination of embodiments), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Embodiments and implementations of the systems and methods described herein may include various operations, which may be embodied in machine-executable instructions to be executed by a computer system. A computer system may include one or more general-purpose or special-purpose computers (or other electronic devices). The computer system may include hardware components that include specific logic for performing the operations or may include a combination of hardware, software, and/or firmware.

It should be recognized that the systems described herein include descriptions of specific embodiments. These embodiments can be combined into single systems, partially combined into other systems, split into multiple systems or divided or combined in other ways. In addition, it is contemplated that parameters, attributes, aspects, etc. of one embodiment can be used in another embodiment. The parameters, attributes, aspects, etc. are merely described in one or more embodiments for clarity, and it is recognized that the parameters, attributes, aspects, etc. can be combined with or substituted for parameters, attributes, aspects, etc. of another embodiment unless specifically disclaimed herein.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Although the foregoing has been described in some detail for purposes of clarity, it will be apparent that certain changes and modifications may be made without departing from the principles thereof. It should be noted that there are many alternative ways of implementing both the processes and apparatuses described herein. Accordingly, the present embodiments are to be considered illustrative and not restrictive, and the description is not to be limited to the details given herein, but may be modified within the scope and equivalents of the appended claims.

The invention claimed is:

1. A method of a user equipment (UE) that performs contiguous partial sensing and periodic partial sensing, comprising:
    determining, during a slot n, that the UE has sidelink (SL) data to transmit;
    determining a time gap between the slot n and a slot $t_y$, wherein the slot $t_y$ is a first slot of periodic-based candidate slots within a resource selection window;
    identifying a packet delay budget (PDB) expiration slot based on a remaining PDB for the SL data;
    performing the contiguous partial sensing for one of a resource selection and a resource re-evaluation for one or more SL transmission resources for the SL data based on a first comparison between the time gap and a first threshold number of slots that is greater than a slot gap number of slots used by the UE for a slot gap for aperiodic traffic and a second comparison between the PDB expiration slot and the slot $t_y$ plus a second threshold number of slots, wherein the slot $t_y$ plus the second threshold number of slots occurs during the periodic-based candidate slots, and
    wherein when the time gap is larger than the first threshold number of slots and when the PDB expiration slot is before the slot $t_y$ plus the second threshold number of slots, the UE performs the contiguous partial sensing for the resource selection.

2. The method of claim 1, wherein the first threshold number of slots is configured or pre-configured according to a SL resource pool configuration for the one or more SL transmission resources.

3. The method of claim 1, wherein the second threshold number of slots is configured or pre-configured according to a SL resource pool configuration for the one or more SL transmission resources.

4. The method of claim 1, wherein the one or more SL transmission resources for the SL data occur prior to the periodic-based candidate slots.

5. The method of claim 1, wherein when the slot n is not predictable at the UE, the contiguous partial sensing occurs during a contiguous partial sensing window from a slot at (slot n+1 slot) to a slot at (slot n+$T_B$ slots), where $T_B$ slots is less than a number of slots from the slot n to the PDB expiration slot minus a third threshold number of slots.

6. The method of claim 5, wherein the third threshold number of slots is configured or pre-configured according to a SL resource pool configuration for the one or more SL transmission resources.

7. The method of claim 1, wherein when the slot n is predictable at the UE, the contiguous partial sensing occurs during a contiguous partial sensing window from a slot at (slot n+$T_B$ slots–31 slots) to a slot at (slot n+$T_B$ slots), where $T_B$ slots is less than a number of slots from the slot n to the PDB expiration slot minus a third threshold number of slots.

8. The method of claim 7, wherein the third threshold number of slots is configured or pre-configured according to a SL resource pool configuration for the one or more SL transmission resources.

9. The method of claim 1, wherein when the slot n is predictable at the UE, the contiguous partial sensing occurs during a contiguous partial sensing window from a slot at (slot n+$t_y$ slot–31 slots) to a slot at (slot n+$T_B$ slots), where $T_B$ slots is less than a number of slots from the slot n to the PDB expiration slot minus a third threshold number of slots.

10. An apparatus of a user equipment (UE) for performing contiguous partial sensing and periodic partial sensing, comprising:
one or more processors; and
memory storing instructions that, when executed by the one or more processors, configure the UE to:
determine, during a slot n, that the UE has sidelink (SL) data to transmit;
determine a time gap between the slot n and a slot $t_y$, wherein the slot $t_y$ is a first slot of periodic-based candidate slots within a resource selection window;
identify a packet delay budget (PDB) expiration slot based on a remaining PDB for the SL data;
perform the contiguous partial sensing for one of a resource selection and a resource re-evaluation for one or more SL transmission resources for the SL data based on a first comparison between the time gap and a first threshold number of slots that is greater than a slot gap number of slots used by the UE for a slot gap for aperiodic traffic and a second comparison between the PDB expiration slot and the slot $t_y$ plus a second threshold number of slots, wherein the slot $t_y$ plus the second threshold number of slots occurs during the periodic-based candidate slots, and
wherein when the time gap is larger than the first threshold number of slots and when the PDB expiration slot is before the slot $t_y$ plus the second threshold number of slots, the UE performs the contiguous partial sensing for the resource selection.

11. The apparatus of claim 10, wherein the first threshold number of slots is configured or pre-configured according to a SL resource pool configuration for the one or more SL transmission resources.

12. The apparatus of claim 10, wherein the second threshold number of slots is configured or pre-configured according to a SL resource pool configuration for the one or more SL transmission resources.

13. The apparatus of claim 10, wherein the one or more SL transmission resources for the SL data occur prior to the periodic-based candidate slots.

14. The apparatus of claim 10, wherein when the slot n is not predictable at the UE, the contiguous partial sensing occurs during a contiguous partial sensing window from a slot at (slot n+1 slot) to a slot at (slot n+$T_B$ slots), where $T_B$ slots is less than a number of slots from the slot n to the PDB expiration slot minus a third threshold number of slots.

15. The apparatus of claim 14, wherein the third threshold number of slots is configured or pre-configured according to a SL resource pool configuration for the one or more SL transmission resources.

16. The apparatus of claim 10, wherein when the slot n is predictable at the UE, the contiguous partial sensing occurs during a contiguous partial sensing window from a slot at (slot n+$T_B$ slots–31 slots) to a slot at (slot n+$T_B$ slots), where $T_B$ slots is less than a number of slots from the slot n to the PDB expiration slot minus a third threshold number of slots.

17. The apparatus of claim 16, wherein the third threshold number of slots is configured or pre-configured according to a SL resource pool configuration for the one or more SL transmission resources.

18. The apparatus of claim 10, wherein when the slot n is predictable at the UE, the contiguous partial sensing occurs during a contiguous partial sensing window from a slot at (slot n+$t_y$ slot–31 slots) to a slot at (slot n+$T_B$ slots), where $T_B$ slots is less than a number of slots from the slot n to the PDB expiration slot minus a third threshold number of slots.

19. A non-transitory computer readable media comprising instructions that, when executed by one or more processors of a user equipment (UE) for performing contiguous partial sensing and periodic partial sensing, cause the UE to:
determine, during a slot n, that the UE has sidelink (SL) data to transmit;
determine a time gap between the slot n and a slot $t_y$, wherein the slot $t_y$ is a first slot of periodic-based candidate slots within a resource selection window;
identify a packet delay budget (PDB) expiration slot based on a remaining PDB for the SL data;
perform the contiguous partial sensing for one of a resource selection and a resource re-evaluation for one or more SL transmission resources for the SL data based on a first comparison between the time gap and a first threshold number of slots that is greater than a slot gap number of slots used by the UE for a slot gap for aperiodic traffic and a second comparison between the PDB expiration slot and the slot $t_y$ plus a second threshold number of slots, wherein the slot $t_y$ plus the second threshold number of slots occurs during the periodic-based candidate slots, and wherein when the time gap is larger than the first threshold number of slots and when the PDB expiration slot is before the slot $t_y$ plus the second threshold number of slots, the UE performs the contiguous partial sensing for the resource selection.

20. The non-transitory computer readable media of claim 19, wherein when the slot n is not predictable at the UE, the contiguous partial sensing occurs during a contiguous partial sensing window from a slot at (slot n+1 slot) to a slot at (slot n+$T_B$ slots), where $T_B$ slots is less than a number of slots from the slot n to the PDB expiration slot minus a third threshold number of slots.

\* \* \* \* \*